United States Patent
Logan (12)

(10) Patent No.: US 9,519,417 B2
(45) Date of Patent: Dec. 13, 2016

(54) SYSTEM AND METHOD FOR ORIENTATION-BASED OBJECT MONITORING AND DEVICE FOR THE SAME

(75) Inventor: James D. Logan, Candia, NH (US)

(73) Assignee: Twin Harbor Labs, LLC, Plano, TX (US)

( * ) Notice: Subject to any disclaimer, the term of this patent is extended or adjusted under 35 U.S.C. 154(b) by 559 days.

(21) Appl. No.: 12/551,076

(22) Filed: Aug. 31, 2009

(65) Prior Publication Data

US 2011/0054830 A1    Mar. 3, 2011

(51) Int. Cl.
| | |
|---|---|
| G06F 15/00 | (2006.01) |
| G06F 3/0487 | (2013.01) |
| G06F 3/01 | (2006.01) |
| G06F 3/0346 | (2013.01) |

(52) U.S. Cl.
CPC ............ *G06F 3/0487* (2013.01); *G06F 3/011* (2013.01); *G06F 3/017* (2013.01); *G06F 3/0346* (2013.01)

(58) Field of Classification Search
USPC ........................ 702/141, 150, 153
See application file for complete search history.

(56) References Cited

U.S. PATENT DOCUMENTS

| | | | |
|---|---|---|---|
| 2005/0027671 A1* | 2/2005 | Hind et al. ................. | 707/1 |
| 2005/0212749 A1* | 9/2005 | Marvit et al. .............. | 345/156 |
| 2007/0016852 A1* | 1/2007 | Kim ..................... | F25D 29/00 |
| | | | 715/236 |
| 2008/0146289 A1 | 6/2008 | Korneluk et al. | |
| 2008/0203107 A1* | 8/2008 | Conley ............. | A61J 7/0472 |
| | | | 221/1 |
| 2008/0214160 A1 | 9/2008 | Jonsson | |
| 2009/0164219 A1* | 6/2009 | Yeung et al. .............. | 704/258 |
| 2009/0322533 A1* | 12/2009 | Bomba et al. ............ | 340/572.1 |
| 2010/0223582 A1* | 9/2010 | Dods .................. | G06F 1/1694 |
| | | | 715/863 |

FOREIGN PATENT DOCUMENTS

EP    1063837 B1    10/2005

* cited by examiner

*Primary Examiner* — Mohamed Charioui
(74) *Attorney, Agent, or Firm* — Richard A. Baker

(57) ABSTRACT

This invention relates to methods and systems for accelerometer-based sensing of motion and orientation of a portable device affixed to or integral with an object, to trigger an audio or visual output based on the motion or orientation of the object the portable device is monitoring. The audio output can be pre-recorded in the device memory or can be user recorded through the "tilt and tell" device voice recording. The invention also employs unique movement and orientation to estimated usage, the person using the device, and other application specific usage information. The unique movement can also be used as user interface to the device.

14 Claims, 20 Drawing Sheets

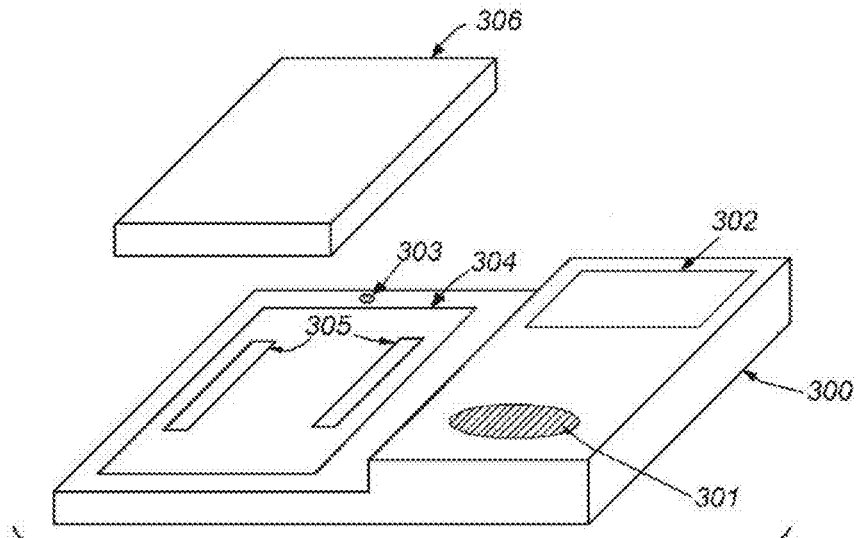
FIG. 12
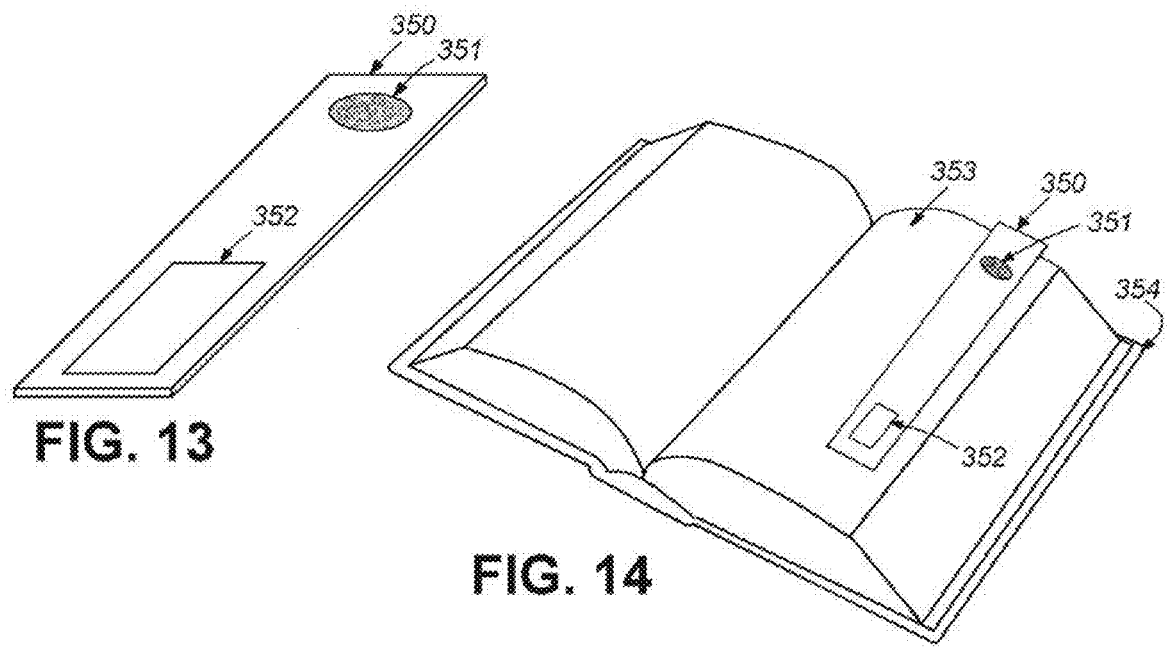
FIG. 13
FIG. 14

SYSTEM AND METHOD FOR ORIENTATION-BASED OBJECT MONITORING AND DEVICE FOR THE SAME

FIELD OF THE INVENTION

This invention relates to methods and systems for accelerometer-based sensing of motion and orientation.

BACKGROUND OF THE INVENTION

Accelerometers are common devices that are often used in multimedia applications, such as cell-phones and MP3 players. Accelerometer based user interface for video games are also known and are popular due to the ease and intuitiveness for new users to learn to deal with the user interface. However, other than within these unique applications, accelerometers are not typically used as an input device for consumers to interface with electronic devices. United States Patent Application No. 2008/0214160 describes an accelerometer or motion-controlled sensing to manipulate the output of multimedia files on the multimedia devices, such as cell-phone, and multimedia players. European Patent Applicant No. EP1063837B1 relates to a telephony device that changes its function from telephone to multimedia player, or to a camera, based on the orientation that the device is held. Though these inventions utilize accelerometer-based sensing as user input to manipulate the control of their device, there is no contemplation of using accelerometer based sensing as the trigger to enable a function and in many embodiments of the invention, to use such interface as the only form of user control.

Human beings are tactile in nature; they learn and absorb information quickly by touching. The world is becoming increasingly more complex, and people are constantly finding novel ways to deal with the complexity. One way that people deal with this complexity is by keeping notes, and journals to keep track of the things they need to remember. By coupling the human experience of touching with speech, which is the easiest means for a person to save a message for themselves, a person can quickly and easily retrieve information that would be not only more conspicuous, but also personalized.

Often time, a need arises for a person to know when household objects was last touched or moved. From a practical context, a person may be interested in creating a record when time sensitive items are created. Leftover food is the most common illustration. When leftover food is stored in a refrigerator, the task is performed quickly and typically without thought. Records archiving when the food was last touched would provide an easier reminder of when the food was stored, which would aid in the decision of whether it would be reusable. In a security context, a person may be interested in monitoring if the privacy of personal items or records has been compromised. Monitoring and creating records of when items such as diaries, personal journals, financial books and statements were last touched provides a means to safeguard personal information from tampering, and unauthorized access.

Similarly, a person may wish to leave a message for themselves or others regarding a particular household object when the object is touched or moved. For example, instead of leaving post-it notes to remind one-self to restock a cabinet with certain canned foods, an audio message can be recorded to provide such reminders.

Within this ever increasingly complex world, there is a growing need and desire to attract a person's attention. Conventional labels and markings that denote alerts and safety messages often fail to attract a person's attention, as people are becoming desensitized to these messages due to information overload. Manufacturers and marketers are always exploring new ways to attract a person's attention and communicate their message. There are businesses, such as greeting card companies, whose sole purpose is to facilitate people relaying a message to someone else.

Low cost pre-recorded messaging triggered by unique movements provide manufacturers of products a means to notify users of safety and operational instructions for certain products as they are removed from their packaging. For example, voice instructions to remove locking pins in a printer may be produced when a printer door is opened for maintenance. Similarly, a greeting message may be played as a consumer opens a packaging box for the first time. Low cost pre-recorded messaging provides a new medium of presentation for marketers. Clearly, it is highly effective to make a sales pitch for a product through the salesperson's own voice.

Unique movements, motions, and orientations are the basis for providing information of value to a person. The motion of tilting, the motion of swinging, the motion of shaking, the motion of orienting an object in an upright position, the motion of swinging along an axis such as a door hinge are examples of such unique movement signatures. A diary that was simply moved does not necessarily constitute a security breach that the diary's owner would care to know about. The owner cares to know if her book was read, which involves the book being oriented upright in a reading position. A printer door that outputs instruction upon any movement is likely outputting nonsensical messages, only when the door hatch is being opened should the message be played. A post-it note that has voice output that continuously plays a pre-recorded message upon every touch would only be an annoyance and neglected by a nearby bystander.

A system which outputs an audio message when it detects unique motion, movement, and orientation would desirably address the needs described above.

SUMMARY OF THE INVENTION

The present invention provides a device, method and system for using an accelerometer sensor to detect motion or orientation of an object, and utilizes a microprocessor to characterize the movement and trigger a stored action. The action could be an audio output that can be an alert, or a message in the form of human speech when a unique movement signature is detected. The stored action triggered by movement could also be to instruct the microprocessor to store the incident of movement (orientation of the object) so as to create a record log of each of the orientations or associated movements of the object, as detected by the device.

In an exemplary embodiment of the invention, a "tilt and display" device is described. The "tilt and display" device utilizes accelerometer readings to monitor when a household object was touched, the device records the time that the device was last touched, and shows the information on a visual display. The device can monitor simple movement, such as when the device was last touched, but can also monitor for complex movement, such as a swinging, shaking, shifting, and tilting, so as to create a log of movements or orientations of the device, thereby determining the usage feedback of the object.

In another exemplary embodiment of the invention, a "tilt and tell" device is described. The "tilt and tell" device is an alternate embodiment of the "tilt and display device". The "tilt and tell" also utilizes accelerometer readings to monitor when a household object was touched, and records the time. However, this embodiment of the invention outputs pre-recorded audio files when a movement of interest is detected. The device also monitors simple movement, such as when the device was last touched or highly complex movement, such as swinging, shaking, shifting, tilting, or orientation.

In yet another exemplary embodiment of the invention, a "tilt and record" device is described. The "tilt and record" is an alternate embodiment of the "tilt and tell" device. The "tilt and record" utilizes accelerometer readings to monitor for acceleration, orientation, motion, and movement. This embodiment incorporates a microphone to record a user generated voice message and outputs the message when triggered by unique movements. Similarly, the device can monitor simple movement, such as when the device was last touched, and complex movement, such as swinging, shaking, shifting, and tilting.

In yet another exemplary embodiment of the invention, application specific movement detection and estimation functions are incorporated into the embodiments of the accelerometer-based movement monitoring device, termed herein as their various embodiments: "tilt and display", "tilt and tell", and "tilt and record" devices. For example, in an application for pill storage, such unique movement detection can determine if a bottle was shaken to take out a pill as well as how many. In another application, unique movement detection determines if a hinged door was swung open, and by whom. In yet another application, unique movement detection can determine if a book was picked up and read as well as the duration it was browsed through. In yet another application, movement can determine if a shipping box was tipped over.

In yet another exemplary embodiment of the invention, movement based user interface functions are incorporated into the portable "tilt and display", "tilt and tell", and "tilt and record" devices. Unique combination of shaking and device orientation enables setting of parameter, toggling of menu selection, as well as to enable the device.

In yet another exemplary embodiment of the invention, energy capture module and rechargeable energy storage are incorporated into the "tilt and display", "tilt and tell", and "tilt and record" to enable extended life operations.

BRIEF DESCRIPTION OF THE DRAWINGS

The invention description below refers to the accompanying drawings, of which:

FIG. 12 is a perspective view of an exemplary embodiment of the portable device as part of an audio post-it note system, according to an illustrative embodiment of the invention;

FIG. 13 is a perspective view of an exemplary embodiment of the portable device as a bookmark, according to an illustrative embodiment of the invention;

FIG. 14 illustrates a perspective view of the bookmark of FIG. 13 utilized in a book, according to the illustrative embodiment;

DETAILED DESCRIPTION

Figure 8:
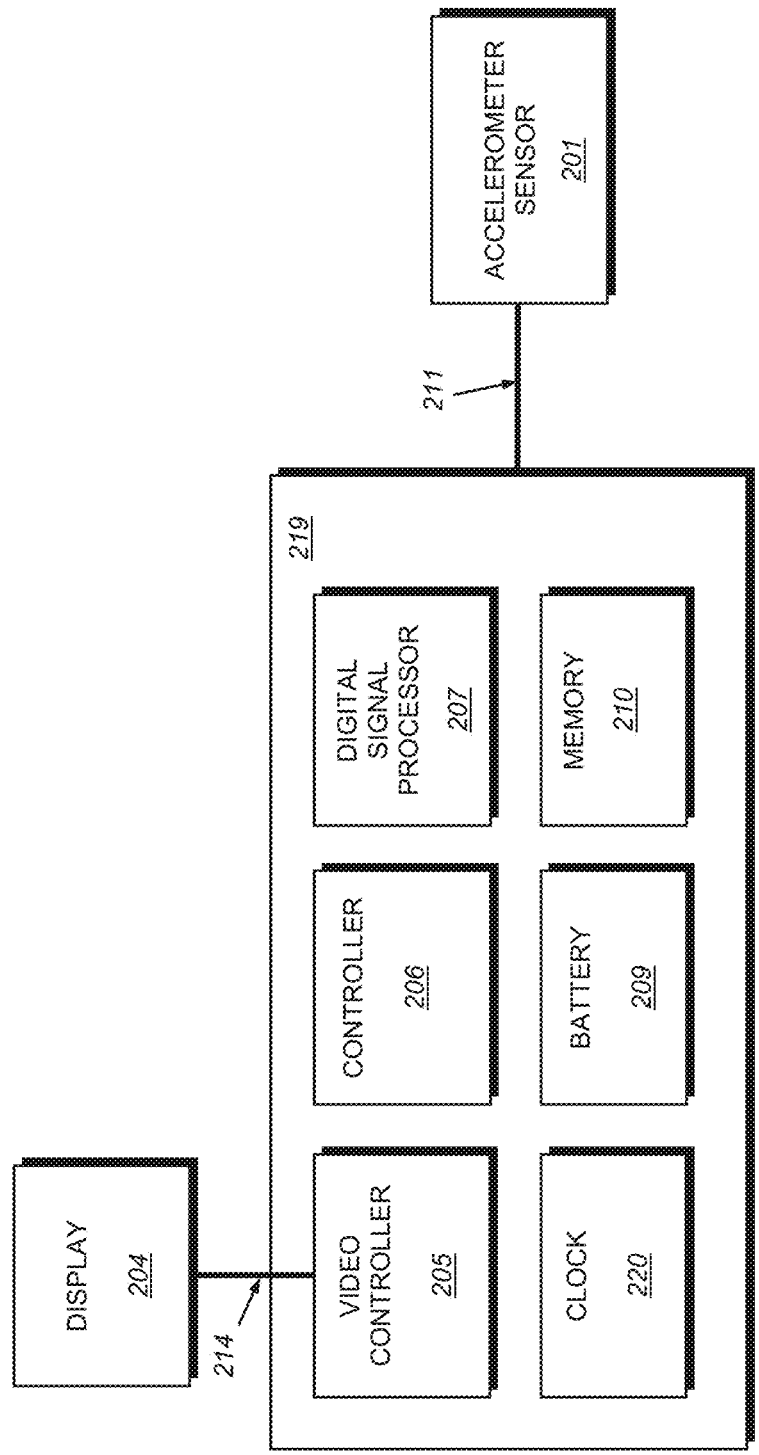
FIG. 8 is a generic system architecture diagram showing the architecture for a portable device that detects motion of an object and displays the last touched information on a display.
Figure 9:
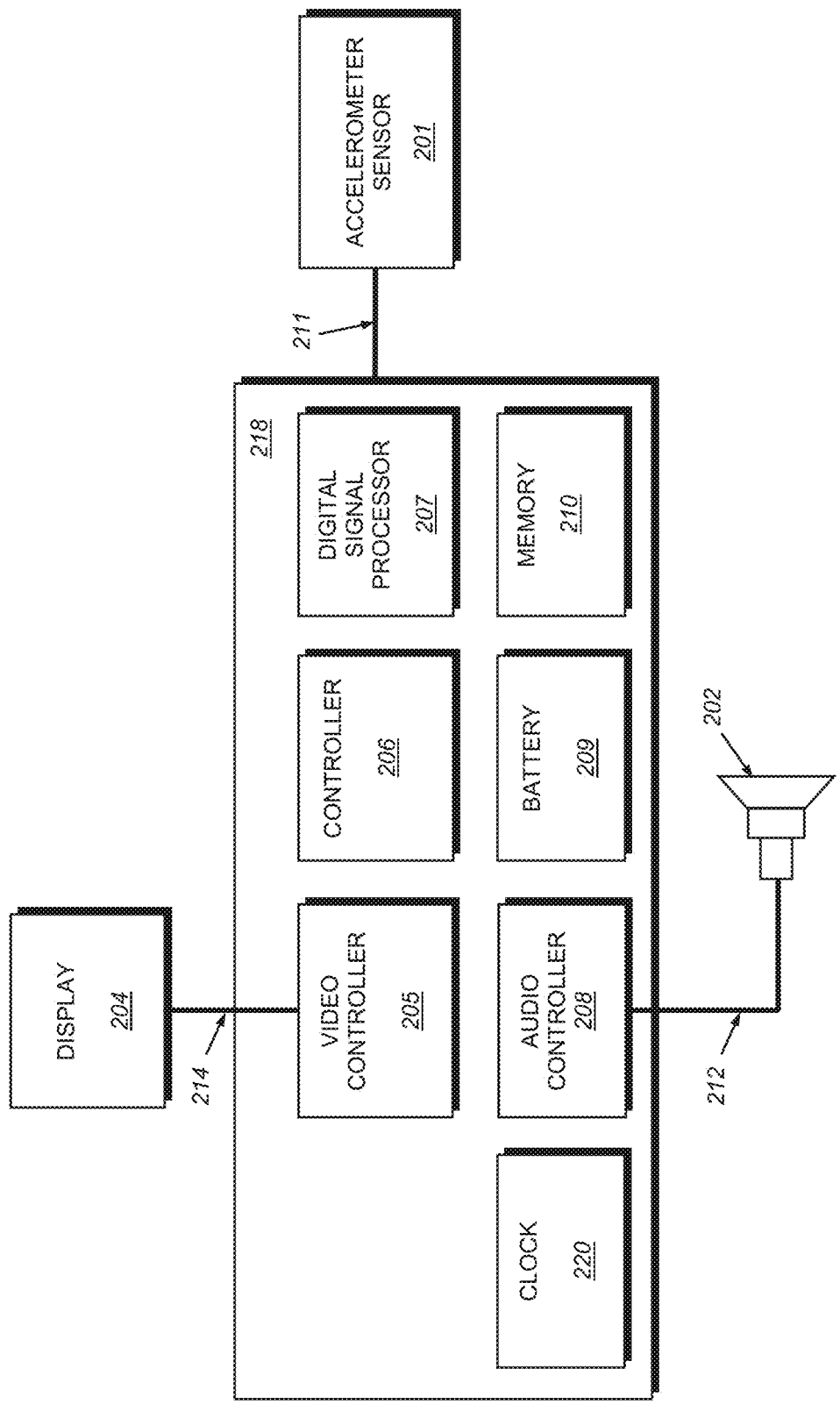
FIG. 9 is a diagram showing the generic system architecture of an exemplary system that detects unique movement, motion, or orientation to output a pre-recorded audio message or alert, according to an illustrative embodiment of the present invention.
Figure 10:
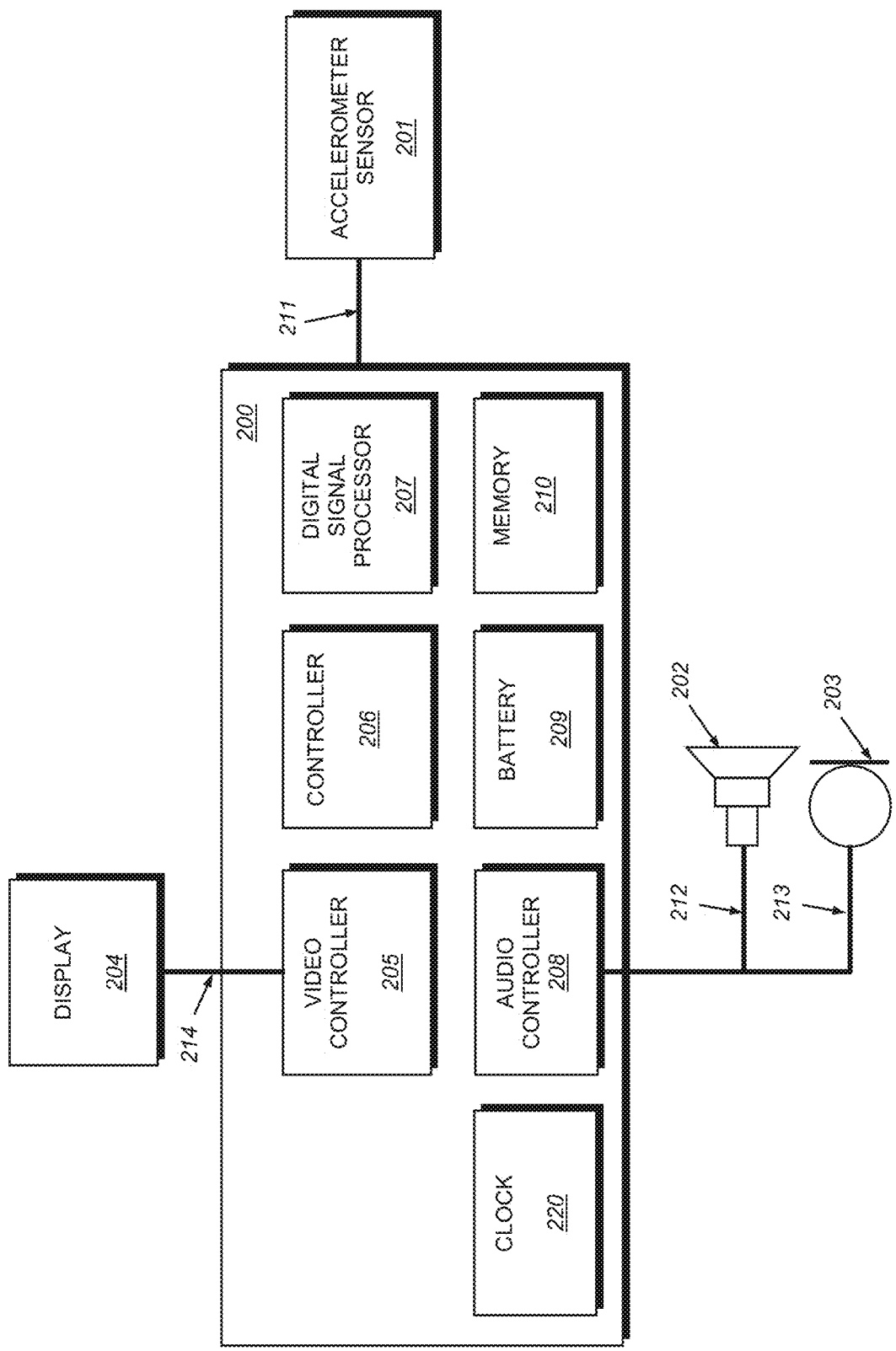
FIG. 10 is a diagram showing the generic system architecture of an exemplary system that detects unique movement, motion, or orientation to output a user recorded audio message, according to an illustrative embodiment of the present invention.

The disclosure presents at least three embodiments of the invention denoted as generic system architecture shown in FIG. 8, FIG. 9, and FIG. 10. Each embodiment of the invention generally includes an object-monitoring device that provides an output mechanism, in display, audio, or recording form, to provide usage feedback of the object.

FIG. 8 refers to a "tilt and display" embodiment of the portable device, which utilizes accelerometer readings to monitor when a household object was last touched and provide the data through an output mechanism, such as showing the information on a visual display. The device shown in FIG. 8 can monitor basic movement, such as when the device was last touched, and complex movement signatures, such as a swinging movement along an offset axis, such as the swinging action of a door on a hinge, as will be described in greater detail herein below.

FIG. 9 refers to a "tilt and tell" device, which also utilize an accelerometer reading to monitor when a household object was last touched and plays a pre-recorded audio message as an output mechanism to provide usage feedback. The device can also monitor simple movement, such as when the device was last touched, and complex movement signatures, such as swinging movement along an offset axis, such as the swinging action of a door on a hinge. The "tilt and tell" also monitors orientation and outputs different pre-recorded audio message depending on the orientation.

FIG. 10 refers to a "tilt and record" device, which builds upon the "tilt and tell". The device also utilizes a solid-state accelerometer reading to monitor when a household object was last touched. The invention has a built-in microphone, thus enabling the user to record their own audio messages, which are played when triggered by detection of specific motion or movements. Similarly, the device can also monitor simple movement, such as when the device was last touched, and complex movement signature, such as swinging movement along an offset axis, such as the swinging action of a door on a hinge. The "tilt and record" also monitors orientation and play different user-recorded or pre-recorded audio output depending on the orientation, as the output mechanism for the device.

Figure 11:
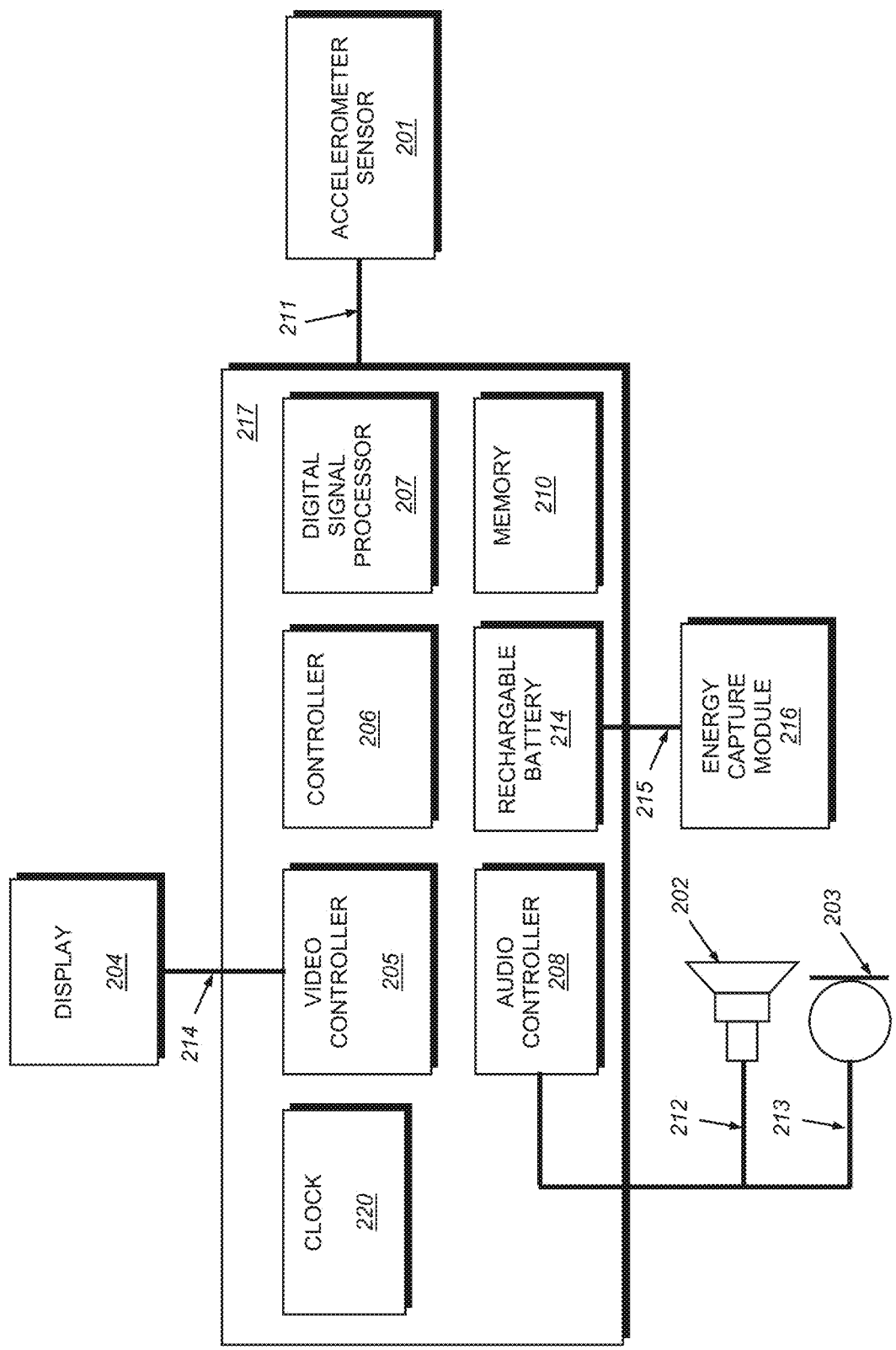
FIG. 11 is a diagram showing the generic system architecture of an exemplary system that detects unique movement, motion, or orientation to output a user recorded audio message including self-recharging capabilities, according to an illustrative embodiment.

FIG. 11 refers to an example of the embodiment of the "tilt and record" device with an energy capture module and rechargeable energy storage to enable extended life operations.

Figure 1A:
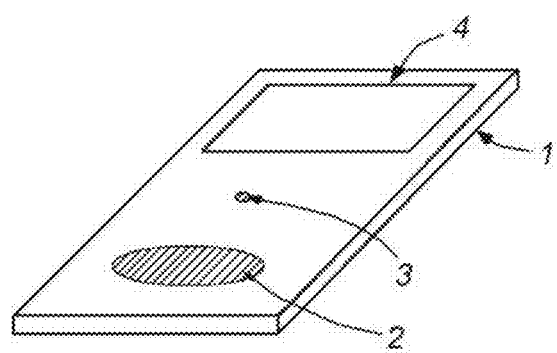
FIG. 1A is a front perspective view of the portable object-monitoring device according to an illustrative embodiment.
Figure 1B:
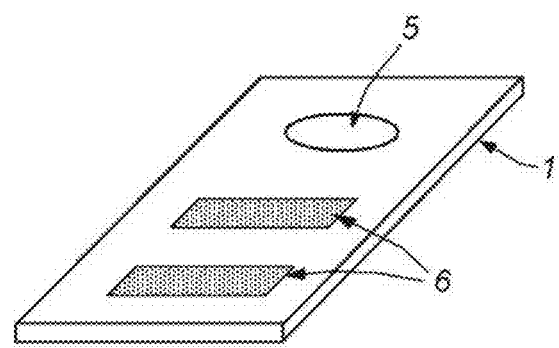
FIG. 1B is a rear perspective view of the device of FIG. 1A, according to the illustrative embodiment.

Referring now to FIG. 1A, according to an illustrative embodiment of the present invention, there is provided a portable object-monitoring device for monitoring usage or other movement of an object. The portable device 1 includes a speaker 2, a microphone 3, and a display 4. As shown in FIG. 1B, it can be affixed onto any object by adhesive pads 6. In an alternate embodiment, the device can be integrated into the household object. Accelerometer sensors (not shown) and accompanying control electronics (not shown) are enclosed within the device 1.

Figure 2:
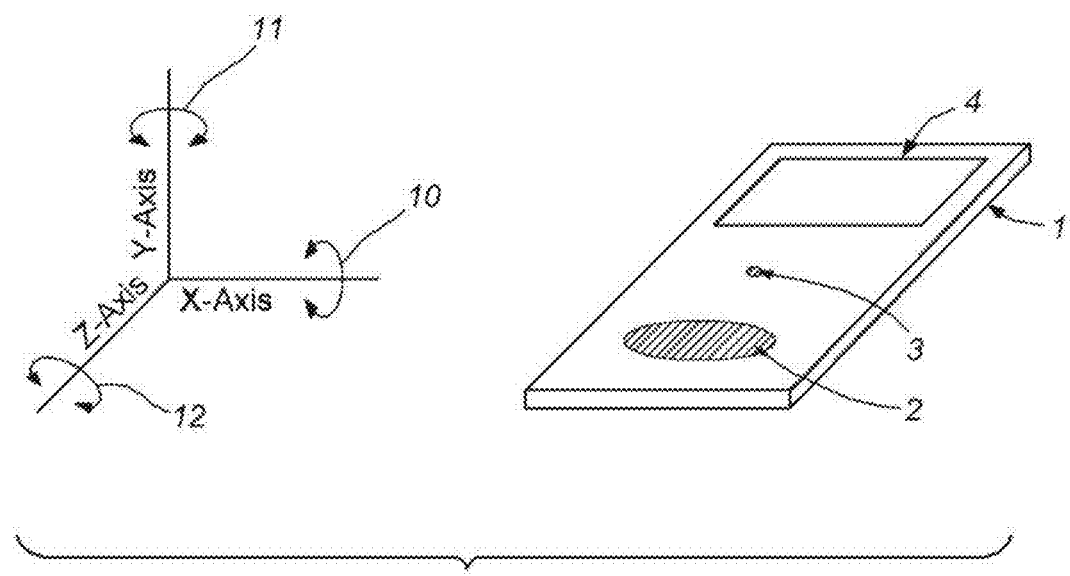
FIG. 2 shows the device of FIG. 1A and an exemplary axis of movement detection according to the illustrative embodiment.

FIG. 2 shows the orientations to which the accelerometer sensors are sensitive. Depending on the application of the device, a plurality of accelerometers may be utilized to detect movement of the device 1 along an x-axis, as shown by arrow 10, a y-axis, as shown by arrow 11, and a z-axis as shown by arrow 12. The accelerometer used to detect movement or orientation of the device can be a two-axis accelerometer, in that it detects movement along two axes, or in the alternative can be a three-axis (triaxial) accelerometer, which detects movement along each of three axes respectively.

Last Touched Indicator

Figure 3:
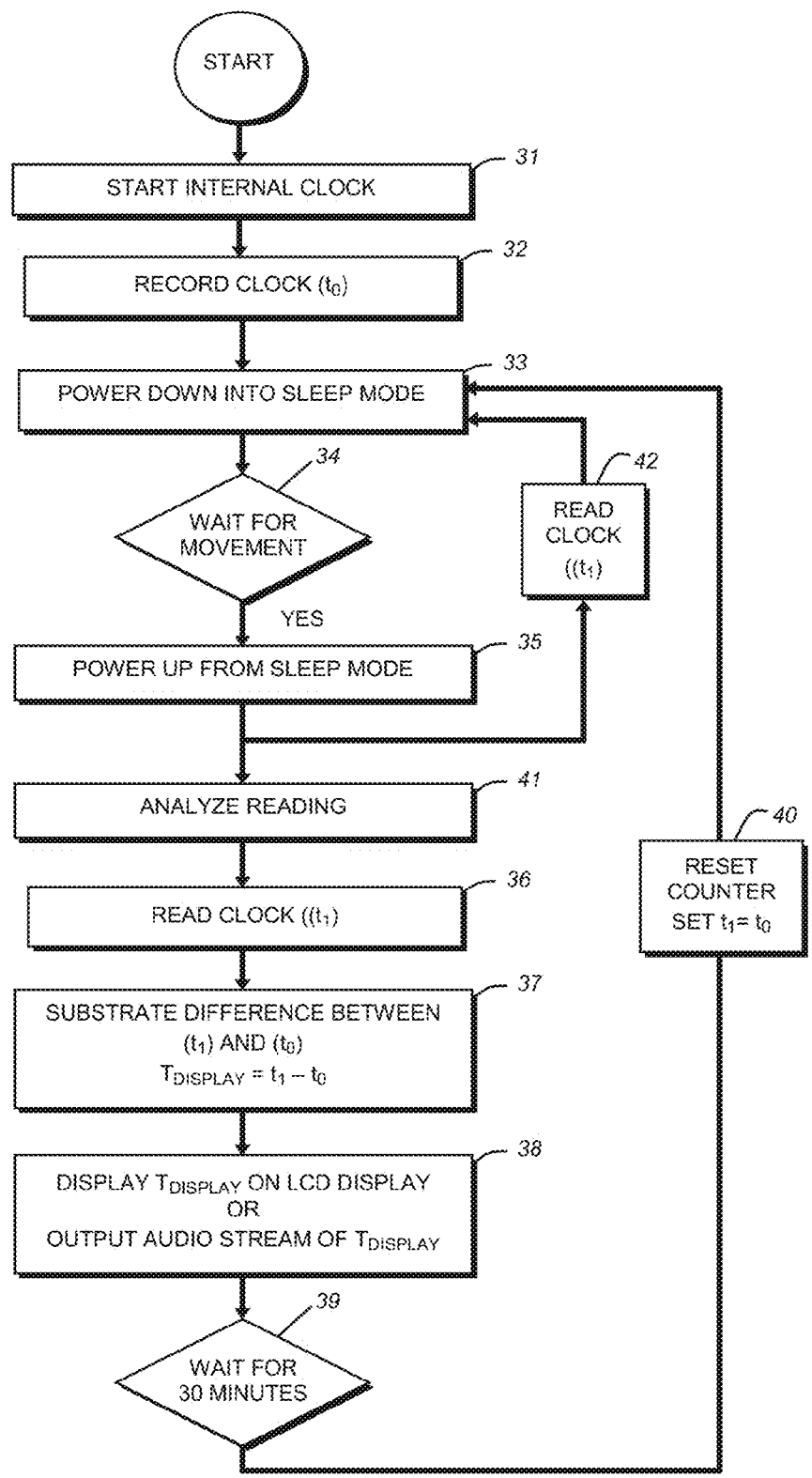
FIG. 3 shows a flow chart for the operation of a portable object-monitoring device embodied as a last touched indicator, according to an illustrative embodiment.

FIG. 3 shows the flow chart for the operation of a "tilt and display" device embodied as a last touched indicator. The operation of the device can be implemented on the hardware architecture described in FIG. 8. The device monitors movement and displays the time between when the movements were detected, as the display is the output mechanism. The "output mechanism" as discussed herein relates to any output mechanism used to provide usage feedback of the object. It can be a display, audio feedback, or recording mechanism.

Referring to FIG. 8, the "tilt and display" device 219 comprises of a controller 206 coupled with a digital signal processor 207 and an internal system timer 220. The digital signal processor 207 processes readings from accelerometer sensors 201. Upon matching of a particular movement signature stored in memory 210, the controller calculates the time difference between the time value stored in memory 210 with the present time and presents the value for display 204 through the display controller 205.

Referring to FIG. 3, a sophisticated power management procedure is performed by the "tilt and display" embodiment of the device 201 to conserve power ensuring longer operations. As shown in FIG. 3, at step 31, the controller 206 is powered up along with the internal clock 220. Then at step 32, the controller 206 records the time value, $t_o$, into memory 210. Memory 210 is illustratively persistent memory in that it does not lose its state upon power down. Then at step 33, the "tilt and display" device enters into a lower power mode, whereby the controller 206 disables non-essential component devices, such as the display 204, display controller 205, and digital signal processor 207. The controller 206 also powers down non-essential peripherals within controller 206 and maintains a minimum monitoring of the accelerometer sensor 201. The sampling rate and number of sensor monitor may be reduced within the low-power state.

In operation of an exemplary embodiment, upon detection of movement or motion by accelerometer 201 by the controller 206 at step 34, the controller 206 initiates step 35 and powers up all disabled peripherals from sleep mode. The controller 206 calculates the difference between the present time and the stored time value in memory 210. The controller 206 signals the display controller 205 to output the difference value on display 205 and stores it in memory 210. Once movement ceases, the controller 206 waits for 30 minutes at step 39, resets the timer at step 40, returns to the low-power mode at step 33, and then advances to step 34, to wait until a movement is detected.

The "tilt and display" embodied as a last touched indicator can be implemented as a portable audio device, as shown in FIG. 9. With similar function and operation, the "tilt and tell" device 218, outputs an audio message through speaker 202 as an alternative to outputting the message on a display. The "tilt and tell" device 218 also comprises of a controller 206 coupled with a digital signal processor 207 and an internal system timer 220. The digital signal processor 207 processes readings from accelerometer sensors 201. Upon matching of a particular movement signature stored in memory 210, the controller calculates the time difference between the time value stored in memory 210 with the present time and outputs a pre-recorded digital audio file stored in memory 210 through the speaker 202.

Smart Pill Bottle

Figure 4:
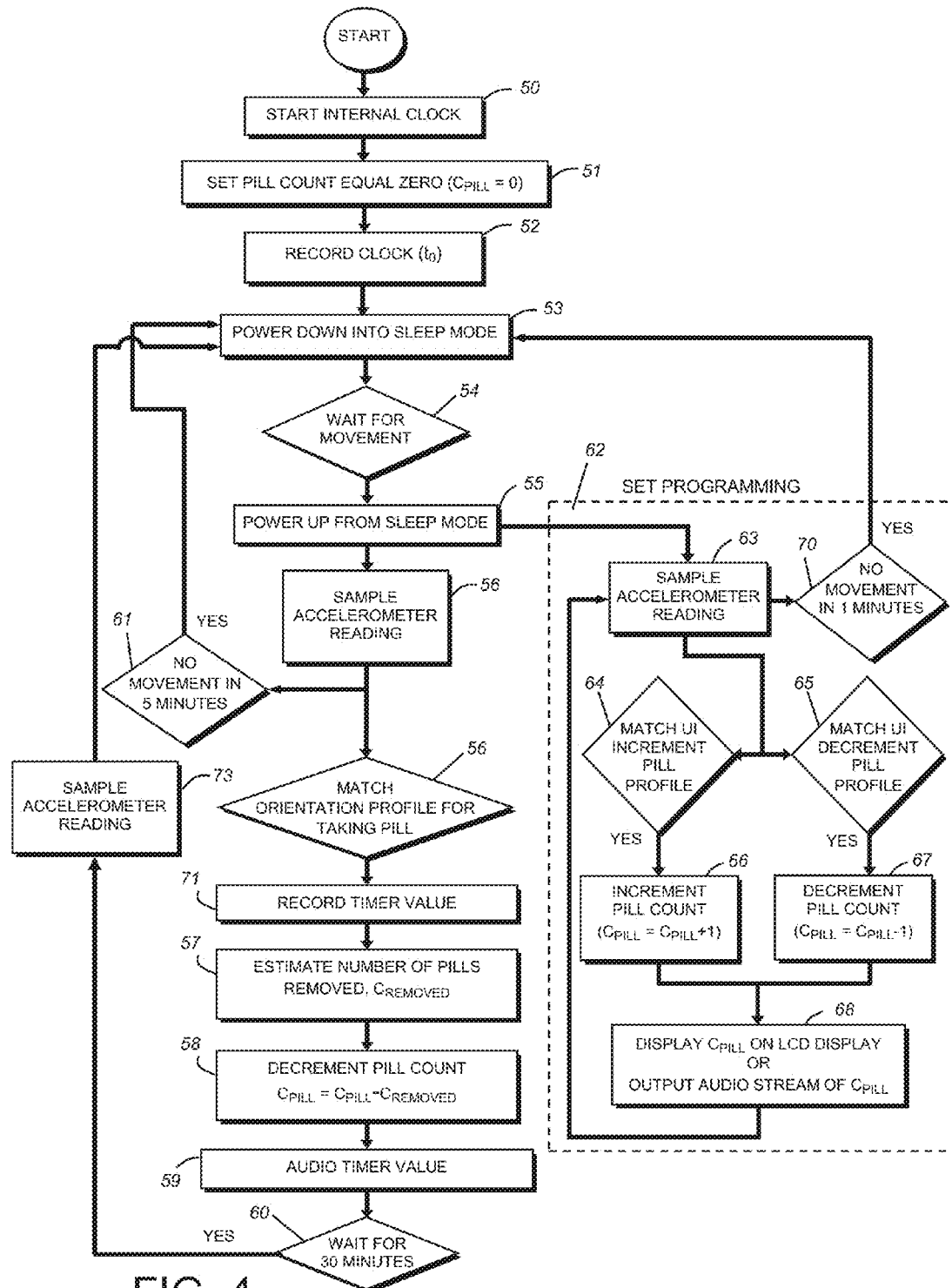
FIG. 4 shows a flowchart for a user operating a portable device embodied as a smart pill bottle, according to an illustrative embodiment.
Figure 18:
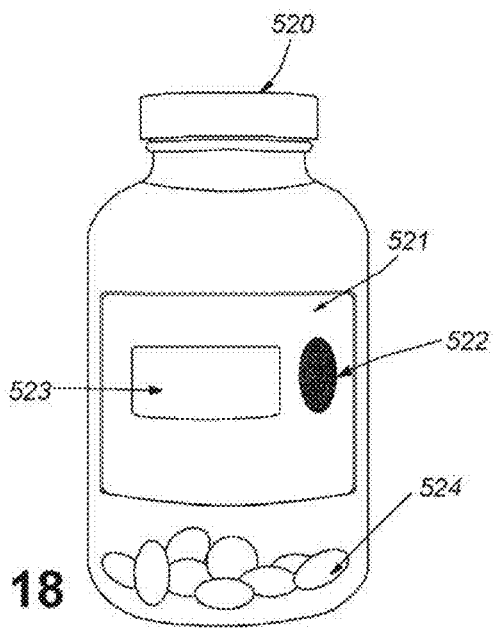
FIG. 18 illustrates a perspective view of an exemplary embodiment of the invention as a smart pill bottle.

Reference is now made to FIGS. 4 and 9 for the object monitoring device embodied as a smart pill bottle. The device can execute application-specific algorithms and/or processes, such as pill counting and estimating algorithms or processes, as well as detection algorithm or process of unique movements, such as shaking when pills are dispensed out of a bottle. This embodiment of invention is exemplified by the smart pill bottle shown in FIG. 18, which shows a pill bottle 520 with an object monitoring device 521 mounted onto or integrated into it.

FIG. 4 shows the flow chart for the operation of an object monitoring device with counting capabilities as referenced in FIG. 9. The smart pill bottle employs an advanced power management procedure and pill-bottle-specific algorithm or process. At power up, the controller 206 is powered up along with the internal clock 220 at step 50. The controller 206 sets the pill counter to zero at step 51 and records the present timer value, $t_o$, at step 52. Then at step 53, the device enters into a lower power mode, whereby the controller 206 disables non-essential components devices, such as the audio controller 208, microphone 202, display 204, display controller 205, and digital signal processor 207. The controller 206 also powers down non-essential peripherals within controller 206 and maintain a minimum monitoring of the accelerometer sensor 201. The sampling rate and number of sensor monitors may be reduced within the low-power state.

Upon detection of movement or motion at step 54 by accelerometer 201, the controller 206 initiates step 55 and powers up all disabled peripherals from sleep mode. Subsequently at step 56, the digital signal processor 207 analyzes the accelerometer sensor 201 reading using a moving time window and compares the reading to unique profiles of objects being shaken out of a bottle pre-stored in memory 210. If a match is found, at procedure step 57 the controller 206 signals the digital signal processor 207 to estimate the number of pills dispensed based on the accelerometer 201 reading of the shaking movements. The controller 206 also records the timer value and calculates the time differences between the present timer value and the stored timer value at step 71. Subsequently, controller 206 subtracts the number of pills estimated by digital signal processor 207 to have been dispensed at step 58. In this manner, a log of the usage of the object (the pill bottle) is created, and fed back to the user, via appropriate output mechanisms, such as a display with the number of pills used, as described herein.

A time-out timer monitors for lack of movement at step 61. The controller 206 goes back to low-power mode at step 53 if no movement is detected within a time period of, for example, 5 minutes.

The controller 206 signals the audio controller 208 to produce an audio output based on audio files stored in memory 210, which corresponded to the intended time value at step 59. The time value denotes the amount of time to when the bottle was last touched. Once movement ceases, the controller 206 waits for 30 minutes at step 60, then resets the timer at step 73, goes back to low-power mode at step 53, and waits until movement is detected.

The controller 206 outputs the difference value on display 205 and stores it in memory 210. Once movement ceases, the controller 206 wait for 30 minutes at step 39. The controller 206 resets the timer at step 40, goes back to low-power mode at step 33, and waits until the next time movement is detected.

The controller 206 can enter into a pill count programming state 62. After an initial movement to wait up the device at step 54, the digital signal processing 207 monitors for a unique movement signal to either increment or decrement pill count. A time-out timer monitors for lack of motion at step 70 to take the controller 206 out of programming mode 62 to the low-power mode 53 if movement is not detected within a 1 minute period. If the digital signal processor 207 matches a unique movement profile corresponding to pill counter increment, the pill counter is incremented at step 66. Subsequently, the controller 206 at step 68 either signals the display controller 205 to show the time information on the display 204 or signals the audio controller 208 to output an audio file to the speaker 202. The controller 206 then goes back to waiting state at step 63. Accordingly, if the digital signal processor 207 matches a unique movement profile corresponding to pill counter decrement, the pill counter is decremented at step 67.

The digital signal processor 207 monitors for unique movement profile to determine if pills are being dispensed. The movement of dispensing a pill comprises of tilting the bottle beyond 45 degrees. The bottle is shook with a distinct and abrupt movement. The digital signal processor 207 estimates if pills were removed by monitoring for such tilting orientation followed by the unique movement profile of the pill dispensing shake. The digital signal processor 207 can also estimate the number of pills removed based on the number of times the bottle was distinctly shaken. The accelerometer sensor 201 readings are stored as a three-dimensional sensor matrix lattice. The digital signal processor 207 utilizes coordinates transformation to normalize the sensor matrix to remove orientation, thus allowing the algorithm or process to work in any orientation of the bottle. The normalized sensor matrix is cross correlated with a unique profile stored in the device memory 210. The digital signal processor 207 detects a pill dispensed when the output of the cross correlation function passes a set threshold value.

The digital signal processor 207 can employ simpler detection algorithm or process. For example, a simple detection algorithm or process only consists of determining whether the bottle has been touched. In such implementation, the digital signal processor is seeking to determine if the bottled has moved. The accelerometer sensor 201 readings are stored in a three-dimensional sensor matrix lattice. A panning window calculates the rate of change between subsequent sampling of the accelerometer sensor 201. The digital signal processor 207 detects a change when the rate of change exceeds a specified threshold for a specified period of time, such as 30 seconds.

The digital signal processor 207 can also determine the orientation of the bottle. Specifically for advertising or instructional purposes, the "tilt and tell" smart pill bottle outputs pre-recorded audio messages when the bottle is oriented and tilted to a certain orientation, specifically when the label on the bottle is being read. The audio message can contain additional messages to supplement the information on the label, or provide additional instruction, or emphasize certain safety elements on the label. Conversely, the message can be an advertising message or a marketing message to promote the product, the company selling the product, or the product brand.

Although bottle orientation is a key element to trigger an audio output, a time delay in the execution of the audio is necessary. The digital signal processor 207 integrates the duration the smart bottle is held in the orientation. An audio message is output when the integrated value exceeds a specified threshold, which is approximately, but not limited to 80-90 percent of the integration window. The audio message is not necessarily played whenever an orientation is matched, as it would be triggered frequently and at inappropriate times. The message would not only wear down battery life, and become a source of noise pollution, but also a nuisance to retailers, shippers, and consumers during shipping, stocking, and handling.

Operational life of such a bottle would only have to be of similar life to the content being stored. Since most medication only has a shelf life of 1 to 2 years, the bottle would only need to have to have operational life slightly longer.

Figure 16:
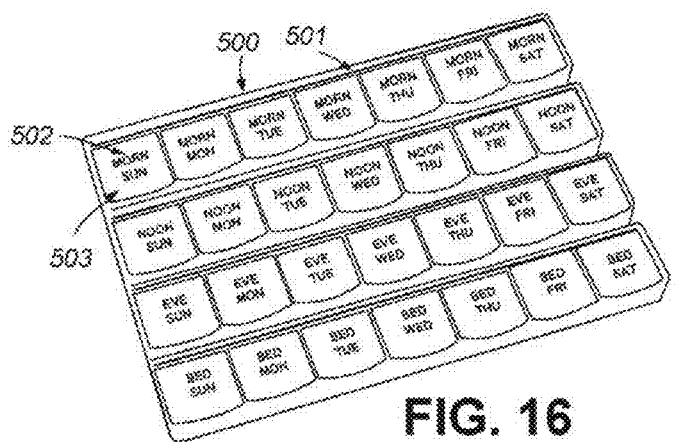
FIG. 16 is a front view of an exemplary embodiment of the invention, wherein the portable device monitors the movements of a smart pill container, according to an illustrative embodiment of the invention.
Figure 17:
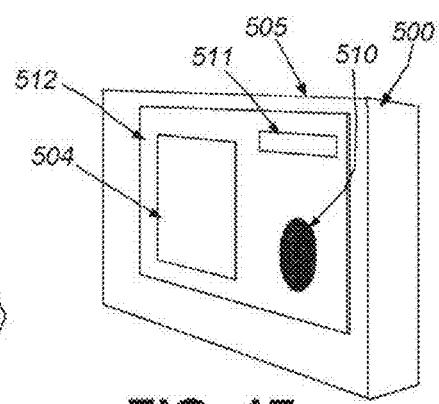
FIG. 17 is a rear view of an the embodiment of the invention as a smart pill container as shown in FIG. 16.

Another embodiment of the "tilt and tell" smart pill bottle is the smart pill container, as shown in FIG. 16 and FIG. 17. In such an embodiment, the pill container 500 has a plurality of sub-compartment 503, which partitions the pills by time and date. The "tilt and tell" device 512 can be either mounted onto or integrated into the pill container 500.

The consumer triggers an audio message by flipping the smart pill container 500 upside down to read the label 504 on the back. Again, a time delay algorithm or process is employed similar to the smart pill bottle to trigger the audio output. The digital signal processor 207 integrates the duration that smart bottle is held tilted while in the reversed orientation. An audio message is output when the integrated value exceeds a specified threshold, which is approximately, but not limited to 80-90 percent of the integration window. The audio message is not necessarily played whenever an orientation is matched, as it would be triggered frequently and at inappropriate times.

The smart pill container can also employ the last touched indicator function. In such an implementation, the digital signal processor 207 is seeking to determine if the container was moved. The accelerometer sensor 201 readings are stored in a three-dimensional sensor matrix lattice. A panning window calculates the rate of change between subsequent samplings of the accelerometer sensor 201. The digital signal processor 207 detects a change when the rate of change exceeds a specified threshold for a specified period of time, such as 30 seconds.

Smart Diary, Journals

The last touched indicator device can be embodied as a smart bookmark 350 for diaries, journals, or financial records shown in FIG. 13 according to an exemplary embodiment. The smart bookmark can be inserted or integrated into a book or journal 354 in FIG. 14.

The smart bookmark has a general architecture of a "tilt and display" portable object-monitoring device 219 shown in FIG. 8. The device 219 comprises of a controller 206, a digital signal processor 207, memory 210, display controller 205, display 204, and accelerometer sensors 201.

FIG. 3 shows the flow chart of a user operating the smart bookmark device. Here in describes the "tilt and display" smart bookmark device, which employs advanced power management scheme. At power up, the controller 206 powers up along with the internal clock 220 at step 31. The controller 206 records the present timer value, $t_o$, and stores the value in memory 210. This creates a stored value representative of the usage of the object, which can be performed repeatedly so as to create a log of usage of the object. Then at step 33, the device enters into lower power mode, whereby the controller 206 disables non-essential components, such as the display controller 205, display 204, and digital signal processor 207. The controller 206 also powers down non-essential peripherals within controller 206 and maintains a minimum monitoring of the accelerometer sensor 201. The sampling rate and number of sensor monitored may be reduced within the low-power state.

Upon detection of movement at step 534 by accelerometer 201, the controller 206 enters step 35 and powers up all disabled peripherals from sleep mode. Subsequently at step 41, the digital signal processor 207 analyzes the accelerometer sensor 201 reading using a moving time window and compares the reading to pre-stored profiles of objects being tilted and oriented in a reading position. If a match is found, the controller 206 enters step 36 and records the timer value, calculates the time differences between the present timer value and the stored timer value at step 37. In this manner, each movement, or orientation, of the object, as determined by the device, is recorded in memory so as to create a log of object usage.

A time-out timer monitors for lack of movement at step 42. The controller 206 goes back to low-power mode at step 33 if no movement is detected within a time period of 5 minutes.

The controller 206 signals the display controller 205 to display the difference in time values on display 205 and stores it in memory 210 at step 38. Once movement ceases, the controller 206 waits for 30 minutes at step 39, then resets the timer at step 40, goes back to low-power mode at step 33, and waits until movement is detected.

The digital signal processor 207 monitors for a unique movement profile to determine if the book was being utilized. The movement of reading a book comprises of orienting the book upright or laying it flat on a surface. The digital signal processor 207 stores the accelerometer sensor 201 readings as a three-dimension sensor matrix lattice. The digital signal processor 207 utilizes vector analysis to determine the orientation of the object. The controller 206 determines if the book is being read if the book was oriented upright for at least 30 seconds. Conversely, the controller 206 determines if the book is being read on a flat surface by monitoring for minute movements and vibrations that suggests the book is being continuously touched for a period of time.

The digital signal processor 207 can employ a simpler detection algorithm or process. A simple detection algorithm or process only consists of determining whether the book has been touched. In such implementations, the digital signal processor is seeking to determine if the book was moved. The accelerometer sensor 201 readings are stored as a three dimensional sensor matrix. A panning window calculates the rate of change between subsequent sampling of the accelerometer sensor 201. The digital signal processor 207 detects a change when the rate of change exceeds a specified threshold for a specified period of time, such as 30 seconds.

Although upright orientation is a key element to trigger an audio output, a time delay in the execution of the audio is necessary. The digital signal processor 207 takes into account the duration that the smart bookmark was held in an upright orientation. The controller 206 triggers a detection when the integrated value exceeds a specified threshold, which is approximately, but not limited to 80-90 percent of the integration window.

The "tilt and display" smart bookmark can be implemented with a security function. A key element of monitoring a diary, journal, or any other record is to determine if an unauthorized user accessed the object. A password scheme can be implemented into the smart bookmark that consists of unique shaking movements that the user programs into the device and are stored in the device memory 210. Thus, upon picking up the smart bookmark device, if the unique shaking movement is detected, an unauthorized access is not triggered.

The "tilt and display" smart bookmark can also be exemplarily embodied as a "tilt and tell" device with a general architecture shown in FIG. 9 according to an alternate embodiment of the present invention. The "tilt and tell" object-monitoring device comprises of a controller 206, digital signal processor 207, display controller 205, display 204, audio controller 208, speaker 202, and accelerometer sensor 201.

The "tilt and tell" smart bookmark has the same user operation flow chart as the "tilt and display" smart bookmark shown in FIG. 3. The basic difference is that instead of indicating the last touched time value on the display, the controller 206 signals the audio controller 208 to output a corresponding audio output of the time value.

The "tilt and tell" smart bookmark has additional security features compared to the "tilt and display" device. Upon detection of unauthorized access of the book, the "tilt and tell" can output an alarm message or an alarm beep to warn the unauthorized user.

The "tilt and display" smart bookmark can further be exemplarily embodied as a "tilt and record" device with a general architecture shown in FIG. 10. The "tilt and record" device comprises of a controller 206, digital signal processor 207, display controller 205, display 204, audio controller 208, speaker 202, and accelerometer sensor 201. Additionally, the "tilt and record" device comprises of a microphone 203 connected to audio controller 208.

The "tilt and record" smart bookmark enables users to personally record voice messages in memory 210 to be utilized upon detection of unauthorized access due to failing to enter password motions.

Smart Cabinet

Figure 15:
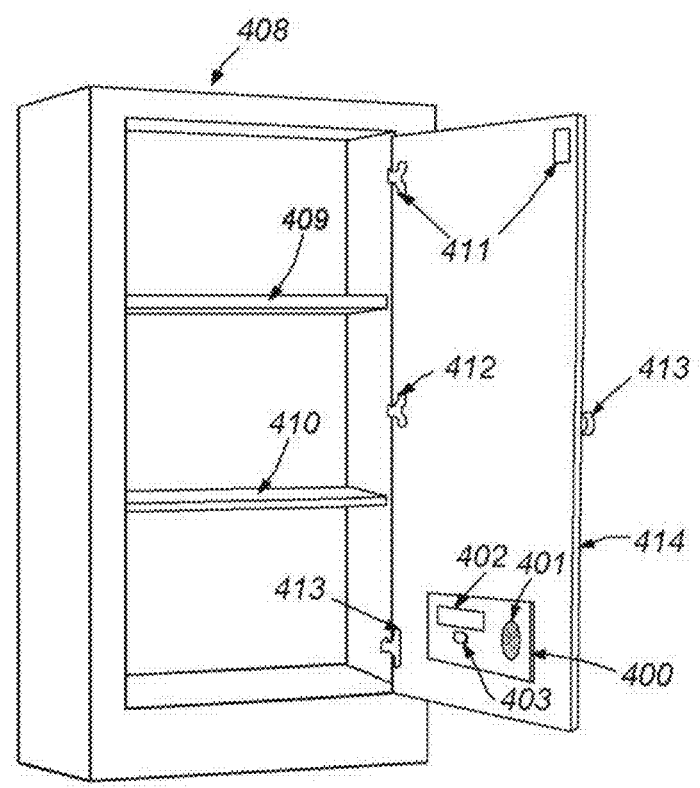
FIG. 15 is a perspective view of an exemplary embodiment of the invention as a device that monitors the opening and closing of cabinet doors, according to an illustrative embodiment of the invention.

FIG. 15 shows another exemplary embodiment of the "tilt and tell" device as a smart cabinet 408. The "tilt and tell" object-monitoring device 400 is mounted onto or integrated into the cabinet door 414.

FIG. 9 represents the general architecture of the "tilt and tell" smart cabinet. The "tilt and tell" device 218 comprises a controller 206, memory 210, digital signal processor 207, audio controller 208, display controller 205, and timer clock 220. The display controller 205 controls output to display 204. The audio controller 208 controls output to speaker 202. The digital signal processor 207 takes sensor readings from the accelerometer sensors 201.

Figure 6:
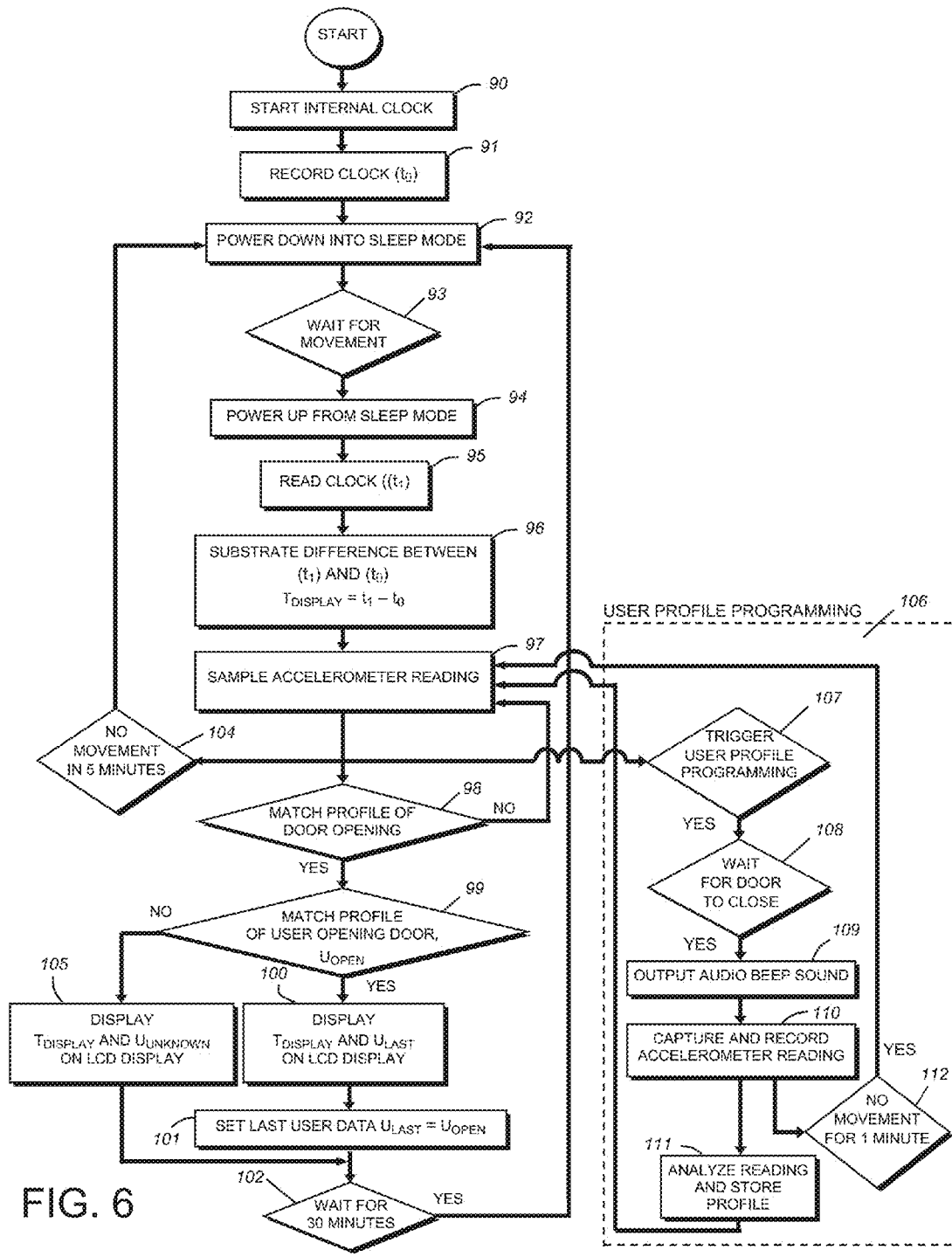
FIG. 6 shows a flowchart for a user operating a portable device embodied as a smart door with user profile estimator, according to an illustrative embodiment.

FIG. 6 shows the flow chart of the user operating the "tilt and tell" smart cabinet device with user profiling capabilities as referenced in FIG. 9. Herein describes the "tilt and tell" smart cabinet device, which employs advanced power management schemes and a smart cabinet specific algorithm or process. At power up, the controller 206 is powered up along with the internal clock 220 at step 90. The controller 206 records the present timer value, $t_o$, at step 91. Then at step 92, the device enters into a lower power mode, whereby the controller 206 disables non-essential component devices, such as the audio controller 208, speaker 202, display 204, display controller 205, digital signal processor 207. The controller 206 also powers down non-essential peripherals within the controller 206 and maintains a minimum monitoring of the accelerometer sensor 201. The sampling rate and number of sensor monitors may be reduced within the low-power state.

Upon detection of movement or motion at step 93 by accelerometer 201, the controller 206 enters step 94 and powers up all disabled peripherals from sleep mode. Subsequently at step 95, the controller 206 records the timer value and then at step 96, calculates the time difference between the present timer value and the stored timer, $t_o$, value in memory 210. The digital signal processor 207 analyzes the accelerometer sensor 201 reading at step 97 using a moving time window. Then at step 98, the digital signal processor 207 compares the sensor reading to pre-stored profiles of the cabinet door 414 being opened. The digital signal processor 207 also determines whether the sensor reading matches to a particular user at step 99.

A time out timer is employed at step 104 to return controller 206 to low-power mode in state 92 if no movement is detected within five minutes after the initial detection of movement.

If digital signal processor 207 matches a user, controller 206 enters step 100 and signals the audio controller 208 to produce an audio output based on audio files stored in memory 210, which correspond to the time value and the last user detected. The controller 206 records the present user as the last user into memory 210 at step 101. Once the door is closed, the controller 206 waits for 30 minutes at step 102, then goes back to low-power mode 92, and waits until movement is detected.

If digital signal processor 207 does not match a user, the controller 206 enters step 105 and signals the audio controller 208 to produce an audio output based on audio files stored in memory 210, which correspond to the time value and the last user detected. The controller 206 records the present user as an unknown user into memory 210 at step 101. Once the door is closed, the controller 206 waits for 30 minutes at step 102, then goes back to low-power mode 92, and waits until movement is detected.

When the cabinet door 414 is opened, the controller 206 can be triggered to enter into a profile training mode 106 by actuation of the programming button 403. The digital signal processor 207 monitors for the cabinet door 414 to close at step 108. Then the controller 206 signals the audio controller 208 to output a beep at step 109. The beep indicates to the user that the device is ready to record the subsequent opening action, which trains the profiler. The digital signal processor 207 monitors for an opening action at step 110. It then records the subsequent opening action in to memory 210 at step 111. If no swinging action was detected within a 1-minute duration, the controller 206 times out the recording function at step 112 and returns to the low-power state 97.

Specific to the "tilt and tell" smart cabinet door, the digital signal processor 207 monitors for unique movement characterized as the swinging of a door. As a door opens the accelerometer sensor is rotating around an offset axis. The speed at which the door is opened and closed can be characteristic of a particular user. The accelerometer sensor 201 readings are stored as a three-dimensional sensor matrix. The digital signal processor 207 utilizes coordinates transformation to normalize the sensor matrix to remove orientation, thus allowing the algorithm or process to work in any orientation of the bottle. The normalized sensor matrix is cross correlated with a unique profile stored in the device memory 210. The digital signal processor 207 detects the cabinet door 414 opening when the output of the cross correlation function passes a set threshold value.

The digital signal processor 207 can employ simpler detection algorithms and/or processes. A simple detection algorithm or process consists of determining whether the cabinet door 414 has moved. In such implementation, the digital signal processor is seeking to determine if the door was moved. A panning window calculates the rate of change between subsequent sampling of the accelerometer sensor 201. The digital signal processor 207 detects a change when the rate of change exceeds a specified threshold for a specified period of time, such as 30 seconds.

The "tilt and tell" smart cabinet door can be implemented with a security function. Since the device can determine the user accessing the cabinet space based on the user profile stored within its memory. If the user is not authorized to access the cabinet space, the device can output an audible alarm or alert to warn the unauthorized user. This function can be utilized for security purposes to deter unauthorized access to sensitive storage space, as well as for restricting access to cabinet space for diet control purposes.

Audio Label Product Boxes

Figure 24:
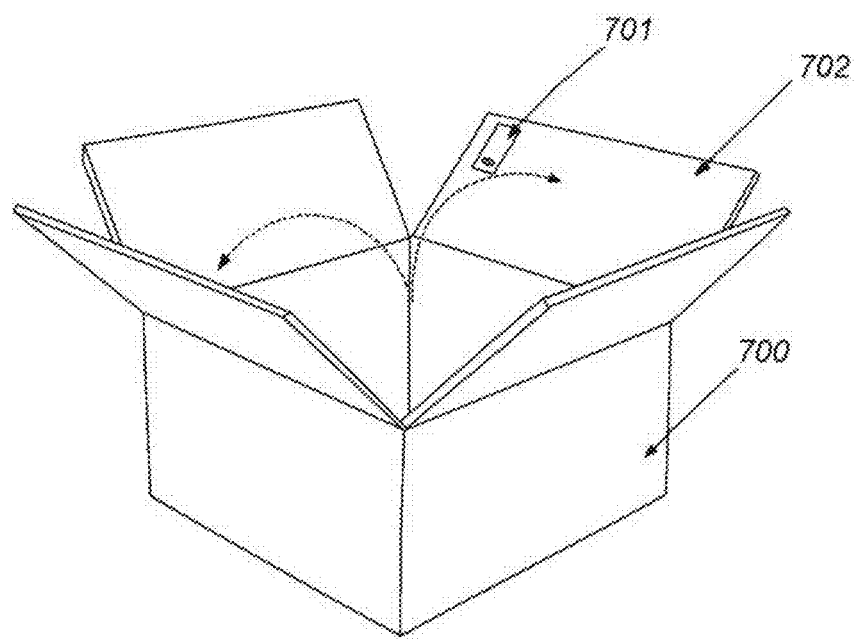
FIG. 24 illustrates a perspective view of the device embodied as an audio label for a product box or package, according to an illustrative embodiment of the present invention.

FIG. 24 shows another exemplary embodiment of the "tilt and tell" device as an audio label for product boxes. The "tilt and tell" object-monitoring device 701 is mounted onto or integrated into product box flap 702, which is part of the product box 700.

Figure 23:
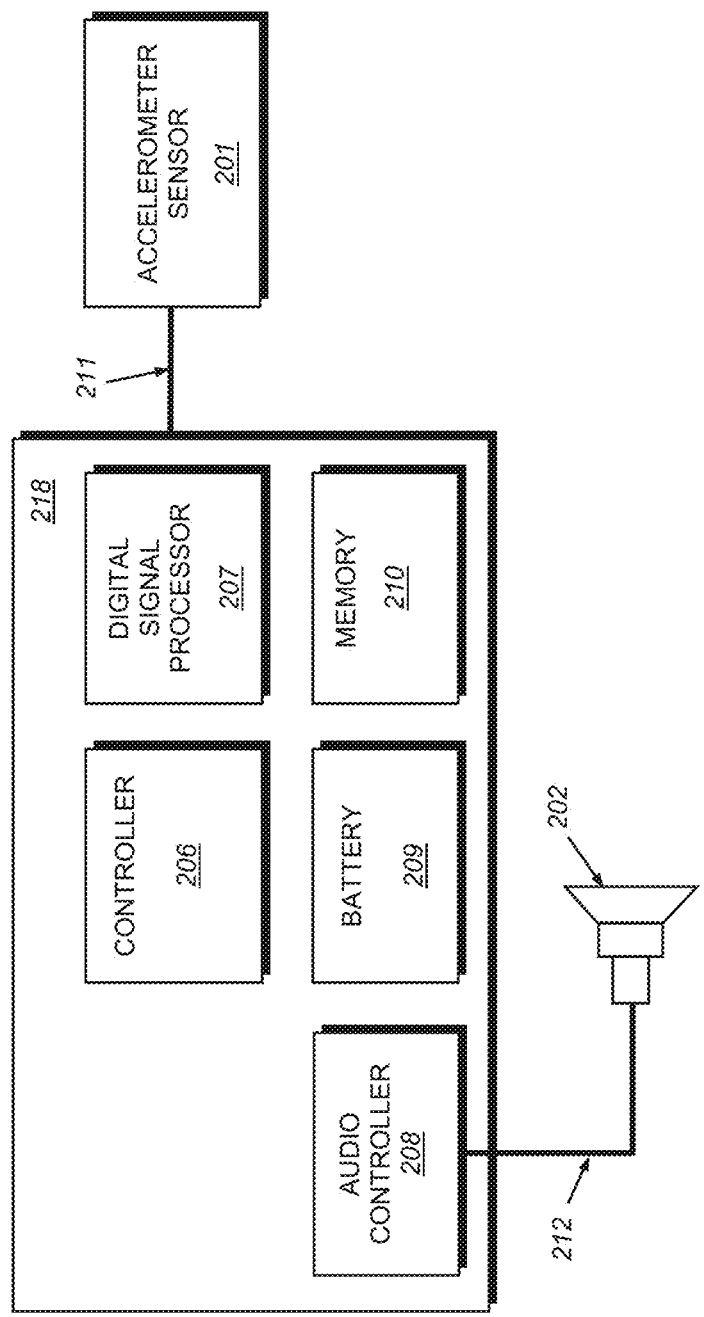
FIG. 23 is a diagram showing the generic system architecture of an exemplary system that detects unique movement, motion, or orientation to output a pre-recorded audio message or alert, according to an illustrative embodiment of the present invention.

FIG. 23 represents the general architecture of the "tilt and tell" product box audio label. The "tilt and tell" device 218 comprises a controller 206, memory 210, digital signal processor 207, and audio controller 208. The audio controller 208 controls output to speaker 202. The digital signal processor 207 takes sensor readings from the accelerometer sensors 201.

Figure 5:
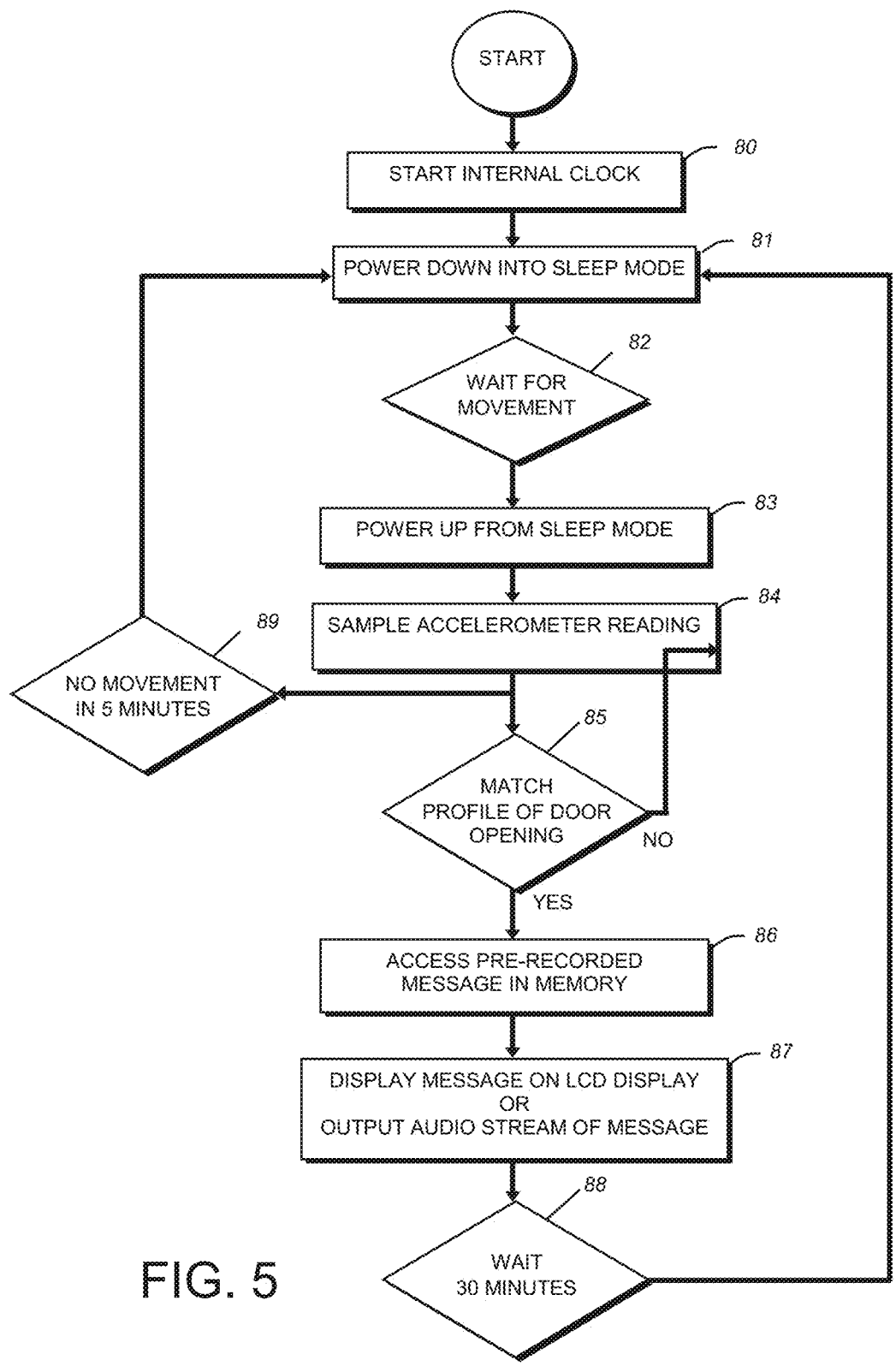
FIG. 5 shows a flowchart for a user operating a portable device embodied as a smart door, according to an illustrative embodiment.

FIG. 5 shows the flow chart of the user operating the "tilt and tell" product box audio label device as reference in FIG. 9. Herein describes the "tilt and tell" product box audio label device, which employs an advanced power management scheme and specific movement detection algorithm or process. At power up, the controller 206 is powered up at step 80. Then at step 81, the device enters into a lower power mode, whereby the controller 206 disables non-essential component devices, such as the audio controller 208, speaker 202, display 204, display controller 205, digital signal processor 207. The controller 206 also powers down non-essential peripherals within the controller 206 and maintains a minimum monitoring of the accelerometer sensor 201. The sampling rate and number of sensor monitors may be reduced within the low-power state.

Upon detection of movement or motion at step 82 by accelerometer 201, the controller 206 initiates step 83 and powers up all disabled peripherals from sleep mode. Subsequently at step 84, the digital signal processor 207 analyzes the accelerometer sensor 201 reading using a moving time window. Then at step 85, the digital signal processor 207 compares the accelerometer 201 reading to stored movement profiles of a box lid opening.

A time out timer is employed at step 89 to return controller 206 to low-power mode in state 81 if no movement is detected within a five minute duration after the initial detection of movement.

If the movement of a box lid opening is matched, the controller 206 initiates step 86 and accesses the pre-recorded audio files stored in memory 210. Then at step 87, the controller 206 signals the audio controller 208 to output an audio file. The controller 206 waits for 30 minutes at step 88, and then goes back to low-power mode 81, and waits until movement is detected.

Specific to the "tilt and tell" product box audio label, the digital signal processor 207 monitors for a unique movement profile characterized as the swinging of a box lid. As a box lid opens, the accelerometer sensor is rotating around an offset axis. The accelerometer sensor 201 readings are stored as a three-dimensional sensor matrix. The digital signal processor 207 utilizes coordinates transformation to normalize the sensor matrix to remove orientation, thus normalizing the operation to any variation in the manufacturing and installation of the device onto the product box. The normalized sensor matrix is cross correlated with a unique profile stored in the device memory 210. The digital signal processor 207 detects the box lid 702 opening when the output of the cross correlation function passes a set threshold value.

The digital signal processor 207 must determine if the box is oriented upright. The orientation and specific motion of opening the box lid is the key element to detection. An incorrect detection would result in the audio message being played during shipping and handling of the device. The result would not only be a nuisance to the shipper, and consumers, but also reduce the operating life of the device.

The "tilt and tell" product box audio label presents a new avenue of marketing and branding for manufacturers and retailers. Custom greeting messages may be pre-recorded on the "tilt and tell" device. Additionally, instructional messages may also be recorded to provide users with instructions on how to unpack the box, or instructions on how to operate the box's contents.

Orientation & Movement Based Greeting Cards

Another exemplary embodiment of the "tilt and tell" device is as a smart greeting card. The "tilt and tell" device would be integrated into a greeting card.

FIG. 23 represents the general architecture of the "tilt and tell" greeting card application of the object-monitoring device. The "tilt and tell" device 218 comprises a controller 206, memory 210, digital signal processor 207, and audio controller 208. The audio controller 208 controls output to speaker 202. The digital signal processor 207 takes sensor readings from the accelerometer sensors 201.

Figure 7:
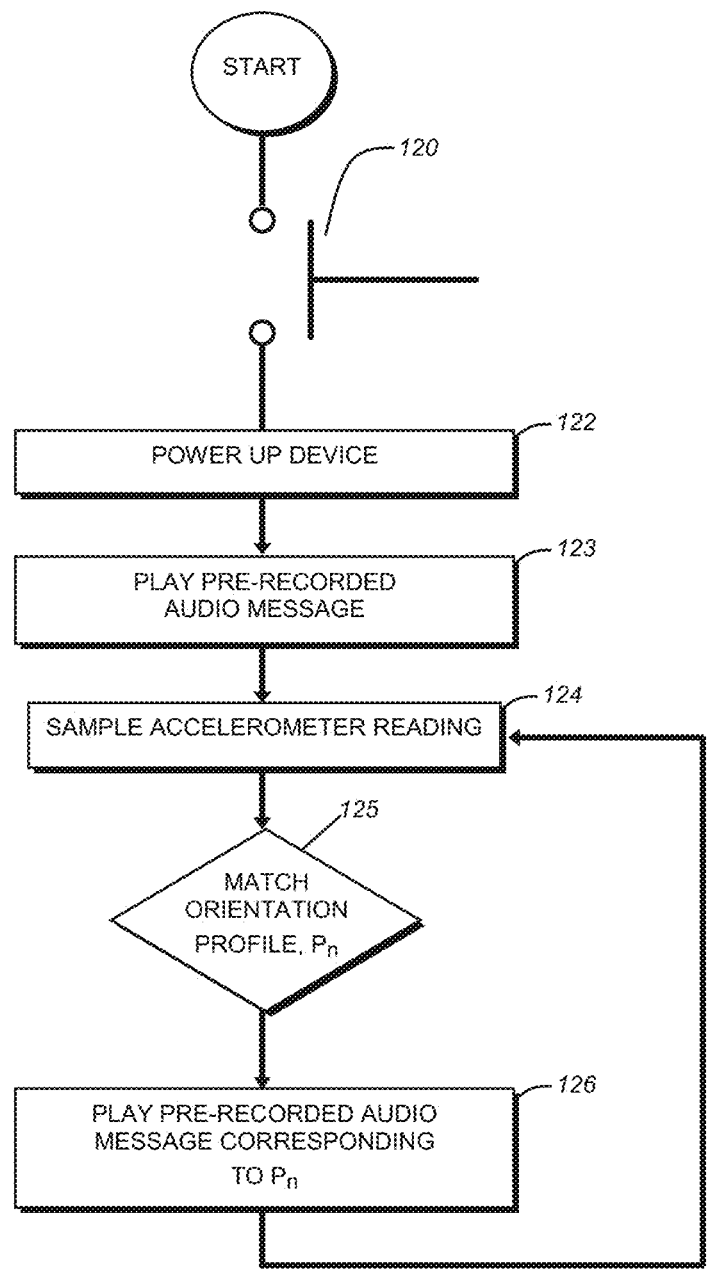
FIG. 7 shows a flowchart for a user operating a portable device monitoring a greeting card, according to an illustrative embodiment.

FIG. 7 shows the flow chart of the user operating the "tilt and tell" greeting card as referenced in FIG. 23. Herein describes the "tilt and tell" greeting card, which employs an advanced power management scheme and a specific movement detection algorithm or process. The device is powered up when a normally open contact switch 120 is closed, thus powering up the device. The controller 206 enters steps 123 and signals the audio controller 208 to play a pre-recorded audio message stored in memory 210. The digital signal processor 207 analyzes the accelerometer sensor 201 reading using a moving time window. Then at step 125, the digital signal processor 207 compares the accelerometer 201 reading to stored movement and orientation profiles stored in memory 210.

If a movement or orientation is matched, the controller 206 initiates step 126 and plays the corresponding audio file. The device shuts off once switch 120 is opened.

The "tilt and tell" greeting card can be programmed with many movement and orientation profiles. In an example of a movement profile, the greeting card is tilted forward and backwards. In another movement profile, the greeting card can be tilted side to side. In yet another example of movement profile, the greeting card can be oriented 360 degrees, with a range of angle corresponding to a different audio file. In yet another example of movement profile, the greeting card can be shaken. In yet another example of movement profile, the greeting card can be swung around. In yet another example of movement profile, the greeting card can be moved like a fan.

The "tilt and tell" greeting card can further be exemplarily embodied as a "tilt and record" device with a general architecture shown in FIG. 10. The "tilt and record" device comprises of a controller 206, digital signal processor 207, audio controller 208, speaker 202, and accelerometer sensor 201. Additionally, the "tilt and record" device comprises of a microphone 203 connected to audio controller 208.

The "tilt and record" greeting card enables users to personally record voice messages in memory 210 to be utilized upon detection of certain orientation movements. For example, a greeting card has an illustration depicting four seasons. As the greeting is rotated every 90 degrees, a different pre-recorded or user-recorded audio file can be played.

Smart Printer Hatch

Figure 19:
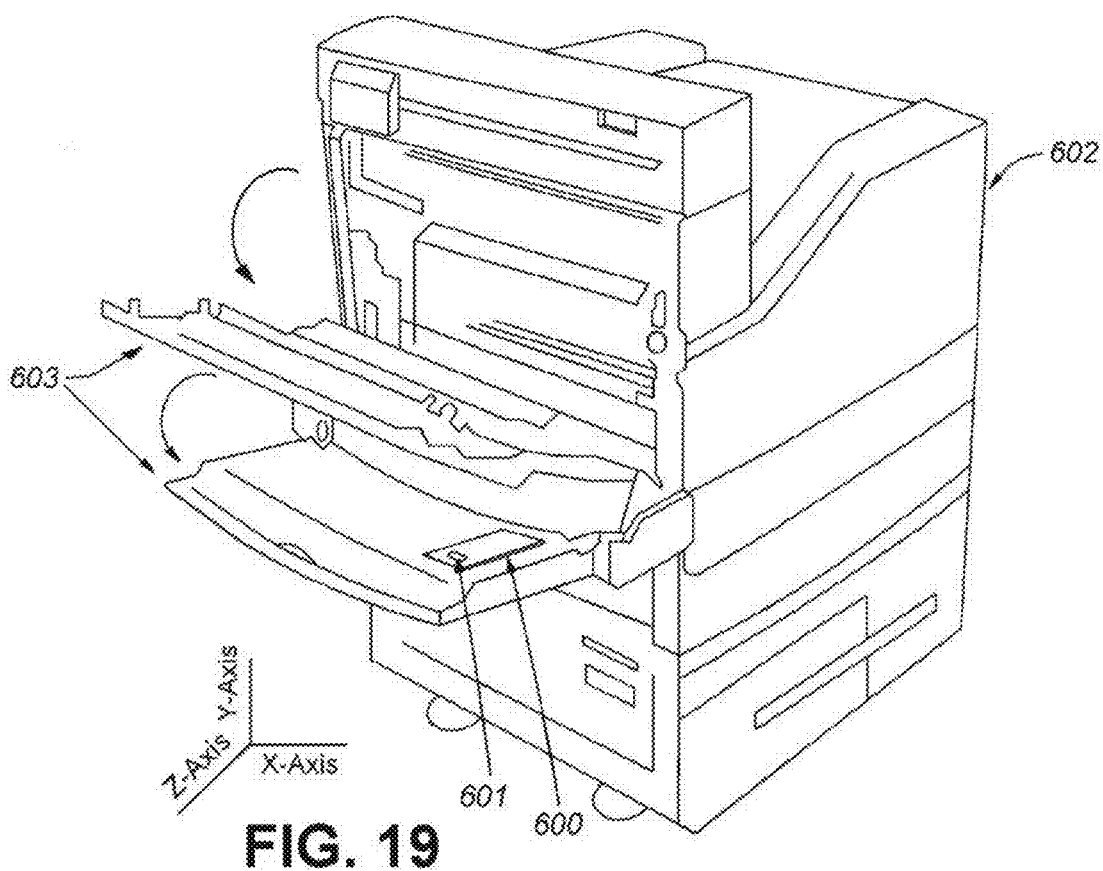
FIG. 19 illustrates a perspective view of an exemplary embodiment of the invention as a device that monitors the opening and closing of access hatch for a commercial printing system.
Figure 20:
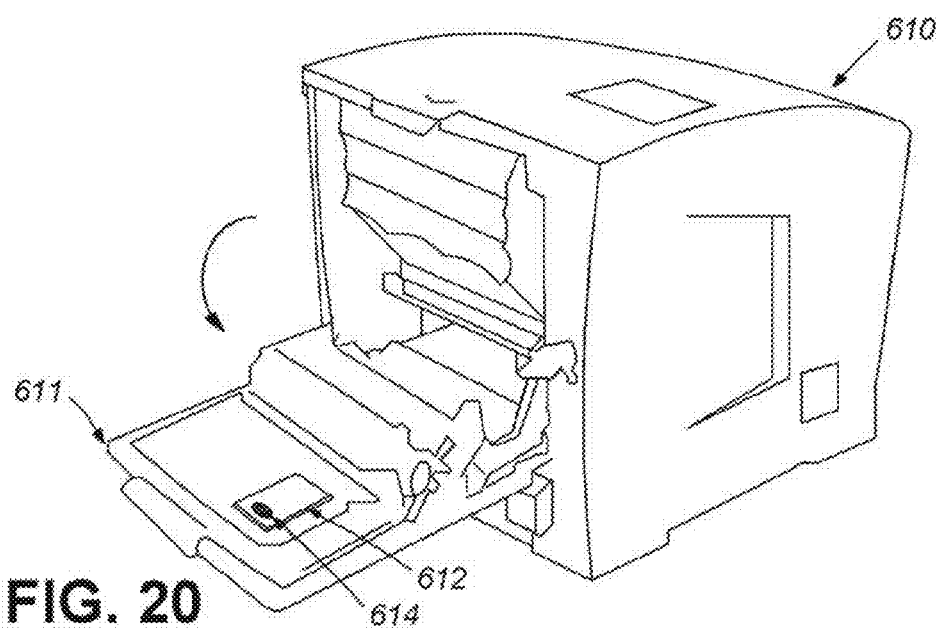
FIG. 20 illustrates a perspective view of an exemplary embodiment of the invention as a device that monitors the opening and closing of access hatch for a personal printing system.

FIG. 19 and FIG. 20 show yet another exemplary embodiment of the "tilt and tell" device for providing voice instruction for printers. The "tilt and tell" object-monitoring device 600 is mounted onto or integrated into printer access hatch 603, which is attached to a commercial printer 602. Similarly, the "tilt and tell" device 612 is mounted onto or integrated into a printer access hatch 611, which is attached to a personal or small business printer 610.

FIG. 23 represents the general architecture of the "tilt and tell" object-monitoring device implemented as a product box audio label. The "tilt and tell" device 218 comprises a controller 206, memory 210, digital signal processor 207, and audio controller 208. The audio controller 208 controls output to speaker 202. The digital signal processor 207 takes sensor readings from the accelerometer sensors 201.

FIG. 5 shows the flow chart of the user operating the "tilt and tell" printer hatch device as reference in FIG. 23. Herein describes the "tilt and tell" printer hatch device, which employs an advanced power management scheme and a specific movement detection algorithm or process. At power up, the controller 206 is powered up at step 80. Then at step 81, the device enters into a lower power mode, whereby the controller 206 disables non-essential component devices, such as the audio controller 208, speaker 202, display 204, display controller 205, digital signal processor 207. The controller 206 also powers down non-essential peripherals within the controller 206 and maintains a minimum monitoring of the accelerometer sensor 201. The sampling rate and number of sensors monitored may be reduced within the low-power state.

Upon detection of movement or motion at step 82 by accelerometer 201, the controller 206 initiates step 83 and powers up all disabled peripherals from sleep mode. Subsequently at step 84, the digital signal processor 207 analyzes the accelerometer sensor 201 reading using a moving time window. Then at step 85, the digital signal processor 207 compares the accelerometer 201 reading to pre-stored profiles of a printer hatch opening.

A time out timer is employed at step 89 to return controller 206 to low-power mode in state 81 if no movement is detected within a five minute duration after the initial detection of movement.

If a user is a match, the controller 206 initiates step 86 and accesses the pre-recorded audio files stored in memory 210. Then at step 87, the controller 206 signals the audio controller 208 to output an audio file. The controller 206 waits for 30 minutes at step 88, then goes back to low-power mode 81, and waits until movement is detected.

Specific to the "tilt and tell" printer hatch device, the digital signal processor 207 monitors for a unique movement profile characterized as the swinging of a printer hatch. As a printer hatch opens, the accelerometer sensor is rotating around an offset axis. The accelerometer sensor 201 readings are stored as a three-dimensional sensor matrix. The digital signal processor 207 utilizes coordinates transformation to normalize the sensor matrix to remove orientation, thus normalizing the operation to any variation in the manufacturing and installation of the device into the printer. The normalized sensor matrix is cross correlated with a unique profile stored in the device memory 210. The digital signal processor 207 detects the printer hatch opening when the output of the cross correlation function passes a set threshold value.

The digital signal processor 207 must determine if the printer is oriented upright. The orientation and specific motion of opening the box lid is the key element to detection. An incorrect detection would result in the audio message being played during shipping and handling of the device. The result would not only be a nuisance to the shipper, and consumers, but also reduces the operating life of the device.

The "tilt and tell" product box audio label presents a new avenue of marketing and branding for manufacturers and retailers. Instructional messages may be recorded to provide users with instruction on how to proceed with maintenance. Additionally, custom-greeting messages may be pre-recorded on the "tilt and tell" device for marketing and branding purposes.

Audio Post It Note

FIG. 12 show yet another exemplary embodiment of the "tilt and record" device as an audio "post it note" device. The audio "post it note" 300 has a speaker 301, display 302, pad space for notes 304, adhesive pads 305, and microphone 303. The primary purpose of the device is to allow user to leave message for themselves or for another person.

The "tilt and record" audio post it note can mount or adhere to cabinet doors, or to room doors. Upon detection of the door opening or closing, the message can be output. The audio post it can be left on top of other household objects, thus when the object is moved, the device would detect such movement and output the user recorded message.

The audio post it can also be implemented with the last touched indicator to provide information on when the device was last touched.

FIG. 10 represents the general architecture of the "tilt and record" audio post-it note. The "tilt and record" device 200 comprises a controller 206, memory 210, digital signal processor 207, audio controller 208, speaker 204, microphone 203, display controller 205, and timer clock 220. The display controller 205 controls output to display 204. The audio controller 208 controls output to speaker 202 and input from microphone 203. The digital signal processor 208 takes sensor readings from the accelerometer sensors 201.

Figure 6B:
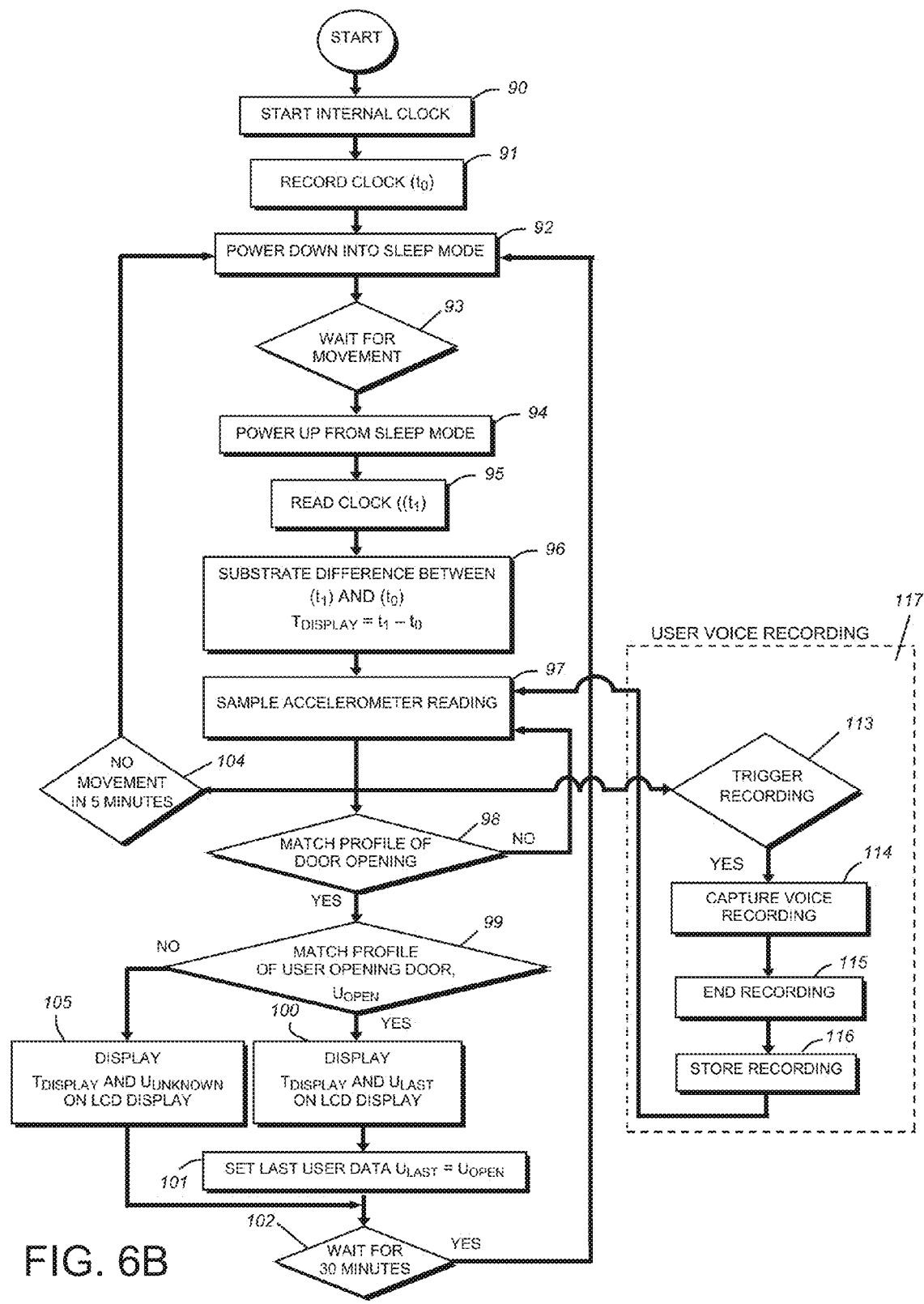
FIG. 6B shows a flowchart for a user operating a portable device monitoring an audio post-it note, according to an illustrative embodiment.

FIG. 6B shows the flow chart of the user operating the "tilt and record" audio post-it note as referenced in FIG. 10. Here in describes the "tilt and record" audio post-it note device, which employs an advanced power management scheme and an audio post-it note specific algorithm or process. At power up, the controller 206 is powered up along with the internal clock 220 at step 90. The controller 206 records the present timer value, $t_o$, at step 91. Then at step 92, the device enters into a lower power mode, whereby the controller 206 disables non-essential component devices, such as the audio controller 208, speaker 202, display 204, display controller 205, digital signal processor 207. The controller 206 also powers down non-essential peripherals within the controller 206 and maintains a minimum monitoring of the accelerometer sensor 201. The sampling rate and number of sensor monitors may be reduced within the low-power state.

Upon detection of movement or motion at step 93 by accelerometer 201, the controller 206 initiates step 94 and powers up all disabled peripherals from sleep mode. Subsequently at step 95, the controller 206 records the timer value and then at step 96, calculates the time difference between the present timer value and the stored timer, $t_o$, value in memory 210. The digital signal processor 207 analyzes the accelerometer sensor 201 reading at step 97 using a moving time window. Then at step 98, the digital signal processor 207 compares the accelerometer reading of the audio post-it note device with pre-stored movement profiles.

A time out timer is employed at step 104 to return controller 206 to low-power mode in state 92 if no movement is detected within a five-minute duration after the initial detection of movement.

When the audio post-it note is picked up, the controller 206 can be triggered to enter into a recording mode 113 by shaking the device. The controller 206 signals the digital signal processor to begin storing the recorded voice at step 114. Once done, the user can shake the device again to stop the recording at step 115. The controller 206 stores the recording in memory 210 at step 116 and goes back to low-power mode at step 97.

Specific to the "tilt and record" audio post-it note, the digital signal processor 207 monitors for a unique movement profile characterized by picking up and viewing the device. The accelerometer sensor 201 readings are stored as a three-dimensional sensor matrix. The digital signal processor 207 utilizes coordinates transformation to normalize the sensor matrix to remove orientation, thus allowing the algorithm or process to work in any orientation of the device. The normalized sensor matrix is cross correlated with a unique profile stored in the device memory 210. The digital signal processor 207 detects that the audio post-it note has been picked up when the output of the cross correlation function passes a set threshold value.

The digital signal processor 207 can employ simple a detection algorithm or process. A simple detection algorithm or process consists of determining whether the audio post-it note device was moved. In such implementations, the digital signal processor is seeking to determine if the device was moved. The accelerometer sensor 201 readings are stored as a three-dimensional sensor matrix. A panning window calculates the rate of change between subsequent sampling of the accelerometer sensor 201. The digital signal processor 207 detects a change when the rate of change exceeds a specified threshold for a specified period of time, such as 30 seconds.

The "tilt and record" audio post-it note device can be implemented with a security function. Unique shaking coupled with orientation can be characterized as a password motion, which would allow the user to then record a message.

Movement Based User Interface

Figure 22:
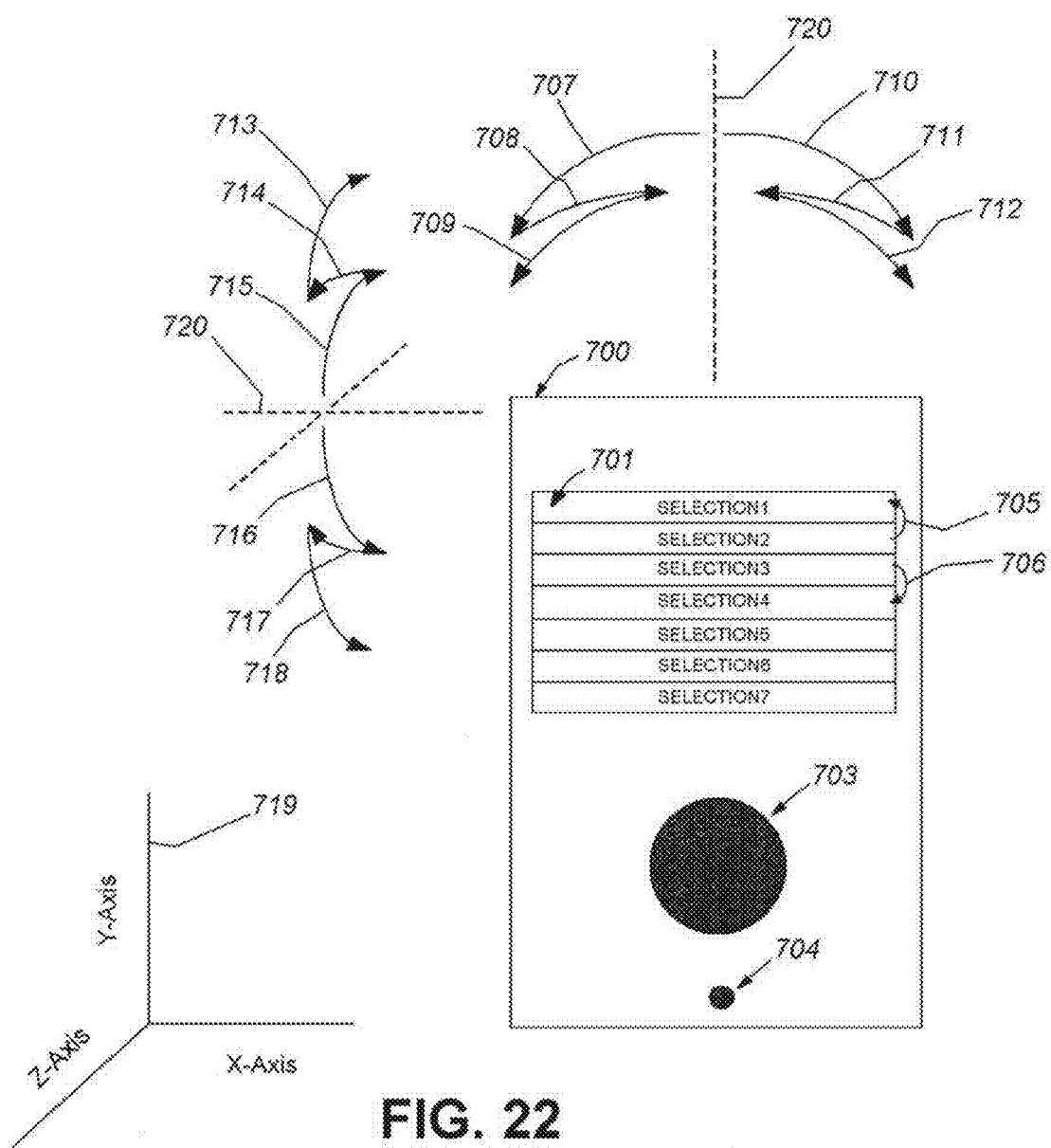
FIG. 22 illustrates a diagram of an example of a movement based user interface, according to an illustrative embodiment of the invention.

All movement based user interface can be implemented with the audio post-it note. FIG. 22 shows an example of all movement based user interfaces implemented into a "tilt and record" device 700. The device 700 has a display 701, audio speaker 703, and audio microphone 704.

The movement-based user interface allows users to cycle through menu selection by making unique movements. As an example, the menu displayed can cycle up the list 705 or cycle down the list 706 base on a unique movement signature. By shaking the device 700 with motion 707, 708, and 709, the user interface cycles the cursor up 705. Conversely, by shaking the device 700 with motion 710, 711, 712, the user interface cycles the cursor down 706.

The same cursor up selection 705 can be implemented by tilting the device 700 forward as characterized by motion 715, 714, and 713. Conversely, the cursor down selection 706 can be implemented by tilting the device 700 backward as characterized by motions 716, 717, and 718.

Smart Resealable Food Storage Container

Figure 21:
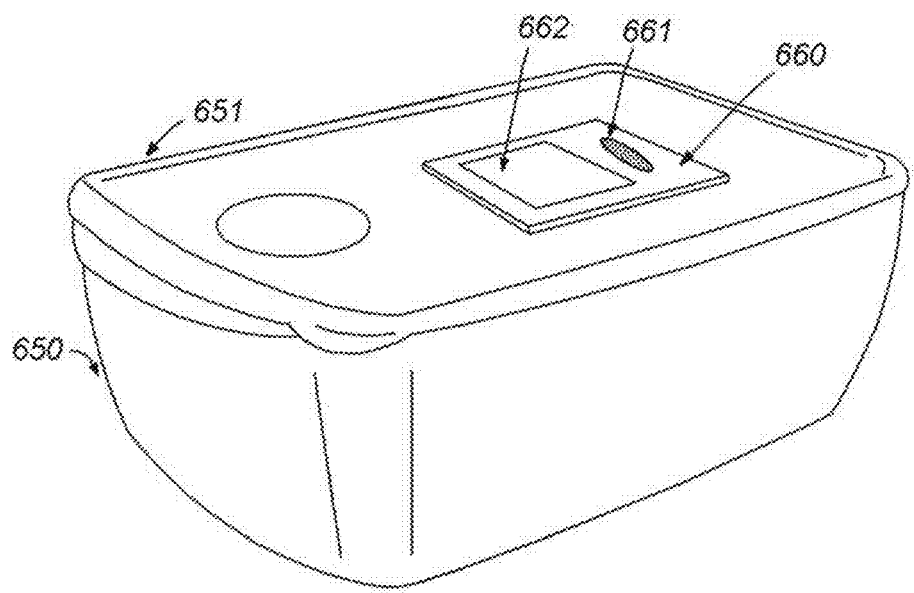
FIG. 21 illustrates a perspective view of an exemplary embodiment of the invention as the device monitoring a food storage receptacle.

FIG. 21 shows yet another exemplary embodiment of the "tilt and record" device as a smart resealable food storage container or receptacle such as those marketed under the well-known Tupperware® brand. The "tilt and record" device 660 can be mounted onto or integrated into a food storage receptacle 600 or the lid of such a receptacle 651.

The smart food storage receptacle can be implemented with the last touched indicator to provide information on when the device was last touched.

FIG. 10 represents the general architecture of the "tilt and record" smart food storage receptacle. The "tilt and record" device 200 comprises a controller 206, memory 210, digital signal processor 207, audio controller 208, speaker 204, microphone 203, display controller 205, and timer clock 220. The display controller 205 controls output to display 204. The audio controller 208 controls output to speaker 202 and input from microphone 203. The digital signal processor 208 takes sensor readings from the accelerometer sensors 201.

FIG. 6B shows the flow chart of the user operating the "tilt and record" smart food storage receptacle as reference in FIG. 10. Herein describes the "tilt and record" smart food storage receptacle, which employs an advanced power management scheme and food receptacle specific algorithm or process. At power up, the controller 206 is powered up along with the internal clock 220 at step 90. The controller 206 records the present timer value, $t_o$, at step 91. Then at step 92, the device enters into a lower power mode, whereby the controller 206 disables non-essential component devices, such as the audio controller 208, speaker 202, display 204, display controller 205 and digital signal processor 207. The controller 206 also powers down non-essential peripherals within the controller 206 and maintains a minimum monitoring of the accelerometer sensor 201. The sampling rate and number of sensor monitors may be reduced within the low-power state.

Upon detection of movement or motion at step 93 by accelerometer 201, the controller 206 initiates step 94 and powers up all disabled peripherals from sleep mode. Subsequently at step 95, the controller 206 records the timer value and then at step 96, calculates the time difference between the present timer value and the stored timer, $t_o$, value in memory 210. The digital signal processor 207 analyzes the accelerometer sensor 201 reading at step 97 using a moving time window. Then at step 98, the digital signal processor 207 compares accelerometer reading of the audio post-it note device with pre-stored movement profiles.

A time out timer is employed at step 104 to return controller 206 to low-power mode in state 92 if no movement is detected within a five-minute duration after the initial detection of movement.

When the smart food storage receptacle is picked up, the controller 206 can be triggered to enter into a recording mode 113 by shaking the device. The controller 206 signals the digital signal processor to begin storing the recorded voice at step 114. Once done, the user can shake the device again to stop the recording at step 115. The controller 206 stores the recording in memory 210 at step 116 and returns to low-power mode at step 97.

Specific to the "tilt and record" food storage receptacle, the digital signal processor 207 monitors for a unique movement profile characterized by picking up and viewing the device. The accelerometer sensor 201 readings are stored as a three-dimensional sensor matrix. The digital signal processor 207 utilizes coordinates transformation to normalize the sensor matrix to remove orientation, thus allowing the algorithm or process to work in any orientation of the device. The normalized sensor matrix is cross correlated with a unique profile stored in the device memory 210. The digital signal processor 207 detects the food storage receptacle being shaken up when the output of the cross correlation function passes a set threshold value.

The digital signal processor 207 can also employ a simpler detection algorithm or process. For example, a simple detection algorithm or process only consists of determining whether the food storage receptacle device was moved. In such implementation, the digital signal processor is only trying to determine if there has been any motion on the device. The accelerometer sensor 201 readings are stored as a three-dimensional sensor matrix. A panning window calculates the rate of change between subsequent sampling of the accelerometer sensor 201. The digital signal processor 207 detects a change when the rate of change calculation exceeds a specified threshold for a specified period of time, such as 30 seconds. According to each of the embodiments, the movement is recorded along with the time the movement occurs, which can thereby be used to create a log of the usage of the object, to provide usage feedback of the object.

Energy Capture Module

Energy capture module can be implemented across all embodiments of the inventions, including the "tilt and display", "tilt and tell", and "tilt and record". FIG. 11 shows the generic architecture of the "tilt and record" device 217 equipped with an energy capture module 216 and rechargeable batteries 214.

The energy capture module can be piezoelectric-based, or photovoltaic based and charges the rechargeable battery 214.

The embodiments of the invention described herein are not intended to be exhaustive or limit the invention to the precise forms disclosed. Rather, the embodiments selected for description have been chosen to enable one skilled in the arts to practice the invention. Although the disclosure is described in connection with voice audio output, it should be understood that additional type of sounds may be used, such as music, tunes, sirens, or beeps. Similarly, the description of accelerometer based sensors does not preclude the use of other motion or movement based sensors that can be used to detect or measure movement, motion, and orientation, such as capacitance, inductance, optical, and infra-red, as well as a combination thereof. Additionally, the description of unique movements sensed are not limited to movement, motion, orientation, tilting, shaking, swinging, flapping, lifting, or dropping.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the object-monitoring devices described herein have been noted as a "tilt and tell", "tilt and display" and "tilt and record", however these terms are used to differentiate between the various embodiments possible with the invention. More particularly, the "tilt and tell" device is used to represent a device that includes an audio message as its output, while the "tilt and display" device is used to represent devices that include a display message as the output. Also, the devices used herein are described in their application to a number of objects, however this list is not exhaustive. The teachings herein are applicable to monitoring of any and all different types of objects. Moreover, the various processors and electronic hardware elements described herein can be implemented using a variety of standard or custom circuits, packaged as a single chip or multiple interconnected circuits. Likewise the processes described herein can be implemented using hardware, software consisting or computer-readable program instructions, or a combination of hardware and software. Accordingly, this description is meant to be taken only by way of example, and not to otherwise limit the scope of this invention.

What is claimed is:

1. A device to determine information about when an object was last touched, comprising;
   a housing affixed to the object including electrical components of the device, the electrical components including a sensor, a display and a pre-programmed processor;
   the sensor affixed to the housing to generate a signal when the object is touched wherein the sensor is a multi-axis accelerometer;
   the preprogrammed processor with instructions related to information concerning the object affixed to the housing and receiving the signal from the sensor to provide predetermined information about the touched object to a user of the device, and
   the display connected to the processor for displaying time information related to when the object was last touched.

2. The device of claim 1, wherein the affixed housing is mounted into the object.

3. The device of claim 1, wherein the affixed housing is mounted onto the object.

4. The device of claim 1, wherein the affixed housing is concealed within the object.

5. The of claim 1, wherein the housing is affixed to a medicine pill box with prescription pills therein and the pre-programmed instructions provide information to the user when the pill box is touched on whether the prescription pills have been taken according to a doctor prescription of the pills for a day, a week, a month or a year.

6. The device of claim 1, wherein the housing is affixed to a food storage container and the pre-programmed instructions provide information about a date and time when the container was placed into a refrigerator.

7. The device of claim 1, wherein the pre-programmed processor with the instructions related to information concerning the object is a microprocessor.

8. The device of claim 1, wherein the pre-programmed processor with the instructions related to information concerning the object is an ASIC.

9. The device of claim 1, wherein the sensor generates the signal when tilted.

10. The device of claim 1, wherein the sensor generates the signal with any movement of the device.

11. The device of claim 1, wherein the pre-programmed processor further includes a memory for the instructions, display, and a display controller.

12. The device of claim 1 wherein the device notifies a user when a unique movement signature is detected by the sensor.

13. A method and process for determining intelligence on how an object is touched, comprising;

affixing a housing to the object, said housing including electrical components of a device;

generating a signal from a sensor affixed to the housing when the object is touched wherein the sensor is a multi-axis accelerometer;

affixing a pre-programmed processor with instructions related to how the object is touched within the housing for receiving the signal from the sensor to provide predetermined information about how the object was touched to an end user of the device, and displaying time information related to when the object was last touched.

14. The method and process of claim 13 wherein the signal is first filtered for a unique movement signature.

* * * * *